United States Patent
Gehrig et al.

(10) Patent No.: US 10,487,299 B2
(45) Date of Patent: Nov. 26, 2019

(54) DEVICE, SYSTEM AND METHOD FOR OBTAINING AND/OR FOR CLARIFYING WORT AND OTHER MEDIA IN THE BEER BREWING AND BEVERAGE INDUSTRY AND CORRESPONDING USES

(71) Applicant: ZIEMANN HOLVRIEKA GMBH, Ludwigsburg (DE)

(72) Inventors: Klaus Gehrig, Ludwigsburg (DE); Klaus Karl Wasmuht, Ellingen (DE); Tobias Becher, Schwieberdingen (DE); Konstantin Ziller, Ludwigsburg (DE)

(73) Assignee: ZIEMANN HOLVRIEKA GMBH, Ludwigsburg (DE)

(*) Notice: Subject to any disclaimer, the term of this patent is extended or adjusted under 35 U.S.C. 154(b) by 48 days.

(21) Appl. No.: 15/523,629

(22) PCT Filed: Nov. 2, 2015

(86) PCT No.: PCT/EP2015/075474
§ 371 (c)(1),
(2) Date: May 1, 2017

(87) PCT Pub. No.: WO2016/071286
PCT Pub. Date: May 12, 2016

(65) Prior Publication Data
US 2017/0313963 A1  Nov. 2, 2017

(30) Foreign Application Priority Data

Nov. 3, 2014 (DE) .......... 10 2014 116 008
Nov. 7, 2014 (DE) .......... 10 2014 116 304
Nov. 7, 2014 (DE) .......... 10 2014 116 308

(51) Int. Cl.
*C12C 7/00* (2006.01)
*C12C 7/16* (2006.01)
(Continued)

(52) U.S. Cl.
CPC .......... *C12C 7/163* (2013.01); *B01D 11/0238* (2013.01); *B01D 11/0242* (2013.01);
(Continued)

(58) Field of Classification Search
CPC .. C12C 7/00; C12C 7/04; C12C 7/042; C12C 7/047; C12C 7/06; C12C 7/062; C12C 7/163; C12C 7/165
(Continued)

(56) References Cited

U.S. PATENT DOCUMENTS 1,922,730 A   8/1933  Gore et al.
2,399,710 A   5/1946  Schock
(Continued)

FOREIGN PATENT DOCUMENTS

DE   295942    1/1915
DE   826742 C  1/1952
(Continued)

OTHER PUBLICATIONS

International Search Report for PCT/EP2015/075474, dated Feb. 10, 2016.
(Continued)

*Primary Examiner* — Reginald Alexander
(74) *Attorney, Agent, or Firm* — Merchant & Gould P.C.

(57) ABSTRACT

Device (V) for obtaining a wort (WO) from a mash (MA) in the beer brewing or beverage industry, at least comprising a receiving unit (AG) for receiving the mash (MA); at least one separating device (T; T1, T2) each having a surface (FA; FA1, FA2); wherein the surface (FA) has a multiplicity of openings (OP); wherein the device (V) is preferably suitable for separating the mash (MA) into the wort (WO) and a residual mash (RM) by means of the surface (FA) of the separating device (T); wherein the surface (FA; FA1, FA2) or a part thereof can be brought into contact with the mash (MA), if the mash (MA) is present in the receiving unit (AG) for separation into the wort (WO) and the residual mash (RM); and wherein, during the operation of the device (V), the surface (FA) is arranged such that it is moved or can be moved or can be rotated relative to the mash (MA), the residual mash (RM) and/or the receiving unit (AG).

8 Claims, 5 Drawing Sheets

(51) Int. Cl.

| | |
|---|---|
| *C12C 7/06* | (2006.01) |
| *B01D 11/02* | (2006.01) |
| *C12C 7/14* | (2006.01) |
| *B01D 33/41* | (2006.01) |
| *B01D 33/15* | (2006.01) |
| *B01D 33/21* | (2006.01) |
| *B01D 33/23* | (2006.01) |
| *C12C 1/00* | (2006.01) |
| *C12C 7/165* | (2006.01) |

(52) U.S. Cl.
CPC ...... *B01D 11/0246* (2013.01); *B01D 11/0249* (2013.01); *B01D 11/0269* (2013.01); *B01D 33/15* (2013.01); *B01D 33/21* (2013.01); *B01D 33/23* (2013.01); *B01D 33/41* (2013.01); *C12C 1/00* (2013.01); *C12C 7/00* (2013.01); *C12C 7/06* (2013.01); *C12C 7/14* (2013.01); *C12C 7/165* (2013.01)

(58) Field of Classification Search
USPC ...................... 99/278, 277, 276; 426/30, 492
See application file for complete search history.

(56) References Cited

U.S. PATENT DOCUMENTS

| | | | |
|---|---|---|---|
| 3,249,443 A | * | 5/1966 | Reiter ........................ C12C 7/00 |
| | | | 426/30 |
| 3,452,669 A | | 7/1969 | Schaus |
| 2012/0093992 A1 | * | 4/2012 | Gattermeyer ............. C12C 7/22 |
| | | | 426/492 |

FOREIGN PATENT DOCUMENTS

| | | |
|---|---|---|
| DE | 1016239 B | 9/1957 |
| DE | 1254566 B | 11/1967 |
| DE | 1642743 A1 | 5/1971 |
| DE | 102007052471 A1 | 5/2009 |
| DE | 102008039373 A1 | 2/2010 |
| WO | 2007/136258 A1 | 11/2007 |

OTHER PUBLICATIONS

Search Report for German Patent Application No. 10 2014 116 308.7, dated Aug. 14, 2015.
Office Action dated Nov. 6, 2018 for corresponding European Application EP 15 791 555.4.

* cited by examiner

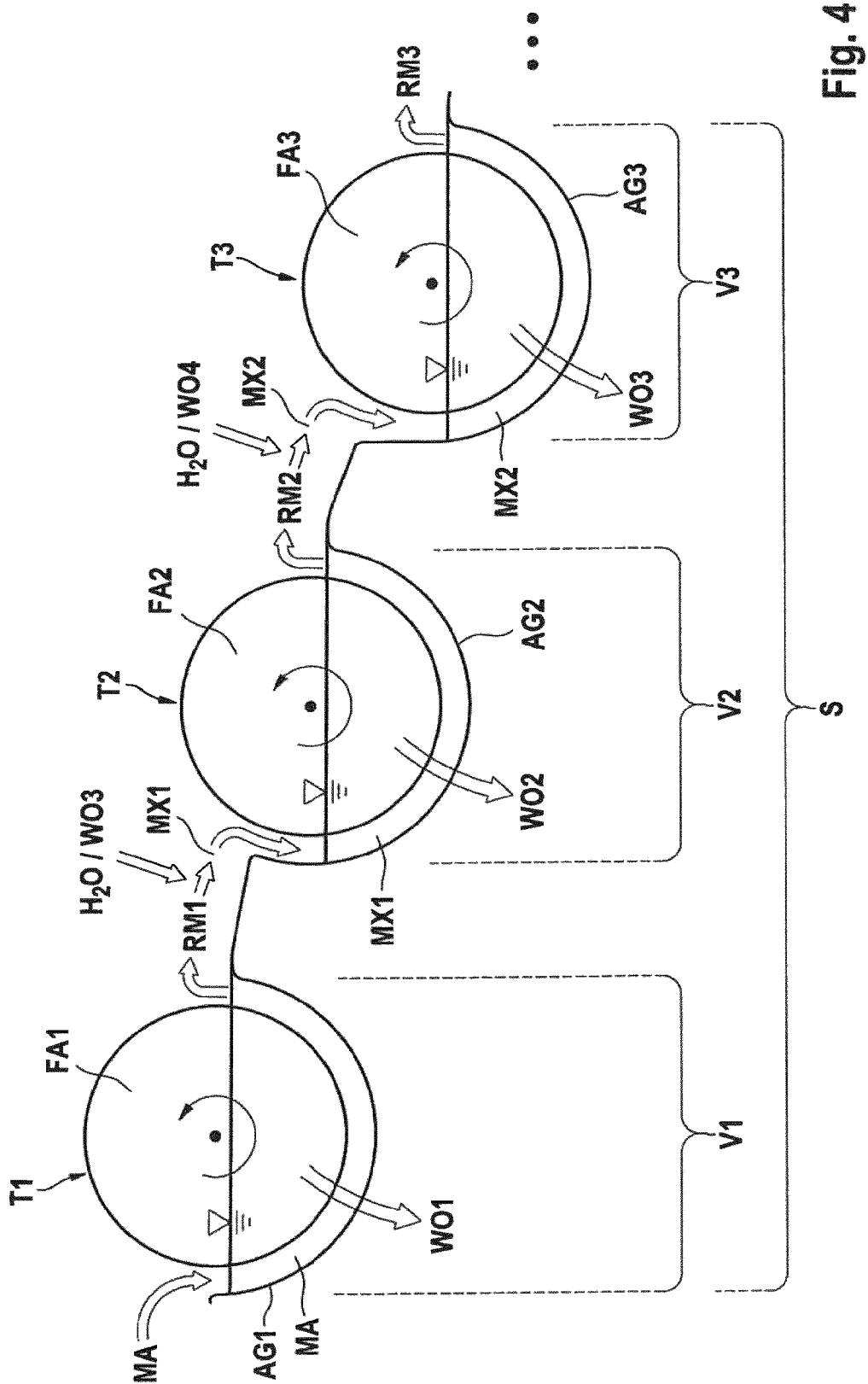

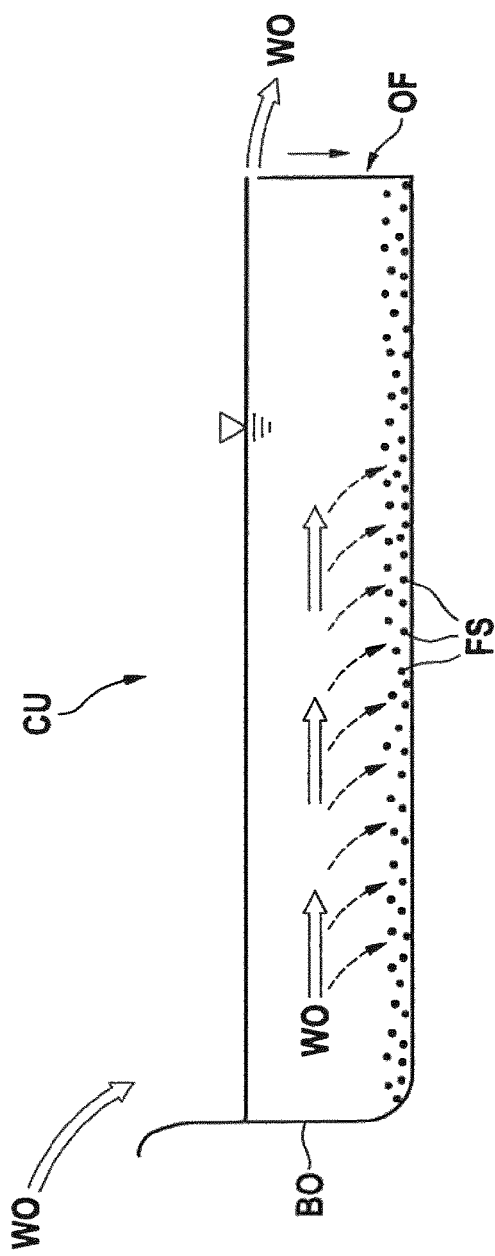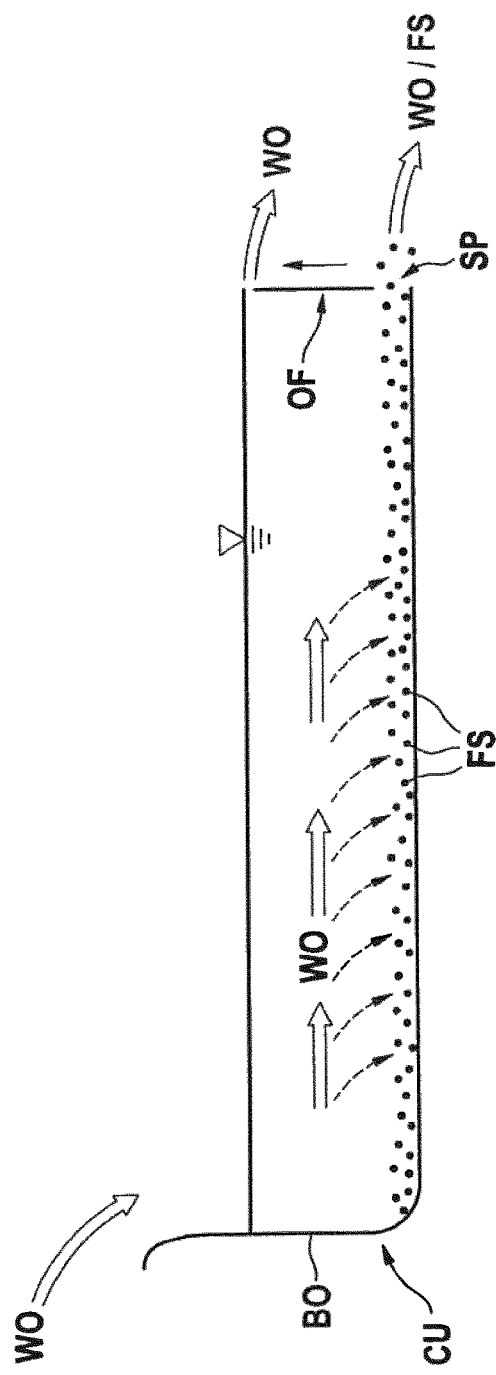

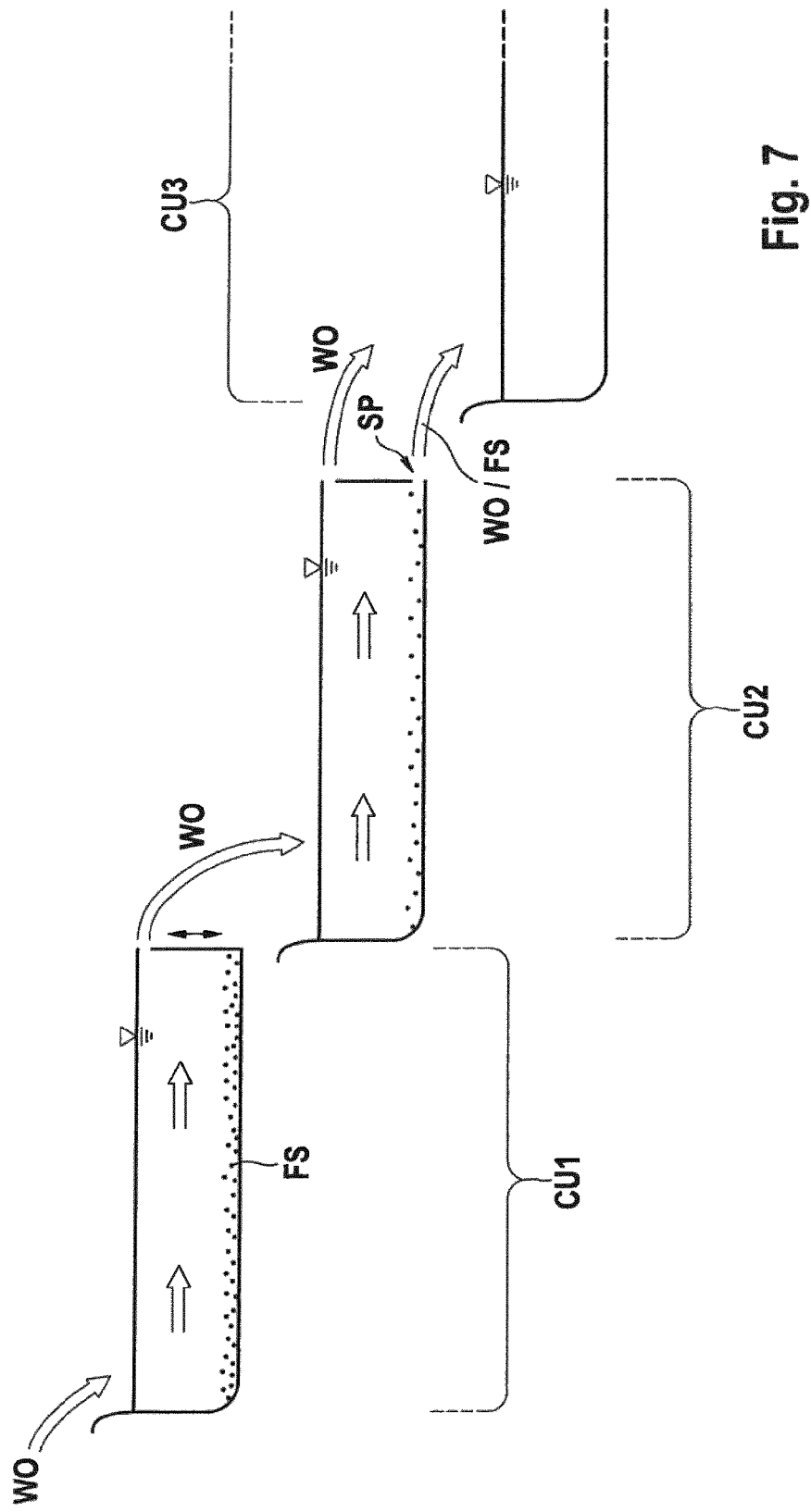

DEVICE, SYSTEM AND METHOD FOR OBTAINING AND/OR FOR CLARIFYING WORT AND OTHER MEDIA IN THE BEER BREWING AND BEVERAGE INDUSTRY AND CORRESPONDING USES

This application is a National Stage Application of PCT/EP2015/075474, filed Nov. 2, 2015, which claims benefit of German Patent Application No. 10 2014 116 008.8, filed Nov. 3, 2014, German Patent Application No. 10 2014 116 308.7, filed Nov. 7, 2014, German Patent Application No. 10 2014 116 304.4, filed Nov. 7, 2014, and which applications are incorporated herein by reference. To the extent appropriate, a claim of priority is made to each of the above disclosed applications.

The invention relates to a device, system and method for obtaining and/or for clarifying wort and other media in the beer brewing and beverage industry and corresponding uses.

BACKGROUND OF THE INVENTION

When obtaining wort in the beer brewing or beverage industry, in particular during the conventional lautering process, such as e.g. in a lauter tun, after introducing mash into the separating device and for the most part observing a lauter rest, a filter layer consisting of material originating from the mash, namely husks or other spent grain components, are formed on the false bottom or on the filter cloth. Thereafter, a wort which initially is turbid and which typically is repeatedly recirculated and then applied to the filter layer until the desired clarification of the wort, i.e. a sufficient decrease in solids and turbidity causing substances, is achieved. Then, the so-called first wort is distilled. Therefore, it is conventionally the case that the separation of the mash into the first wort and spent grains and the clarification of the wort obtained take place in the same device and predominantly at the same time. After the wort has been absorbed into the filter cake (spent grains layer), hot water is added to the surface of the filter cake to wash out the spent grains layer. As a result, a further extract in the form of a diluted wort, the so-called post-run worts, is obtained.

To date, for many technological reasons there has been a desire to obtain worts with a higher level of clarity. For instance, experts within the German brewing industry hold the view that with regard to beer quality, turbid lauter worts should not be obtained. In contrast, the highest possible level of clarity of the wort during lautering is considered to be a prerequisite for achieving impeccable beer quality, in particular in relation to taste quality, taste stability, physical stability and/or froth stability.

A disadvantage in the conventional procedure of obtaining wort is that the method step of lautering for at least 90 min per brew batch, often 120 min per brew batch or even longer, required a long period of time. In the meantime, the procedure of obtaining wort thus constitutes, in relation to the method steps performed in the brewhouse, the time-limiting method step. For a long time there has been a desire to considerably reduce the method step of obtaining and clarifying wort or even to perform it as a continuous method step. In practice, it has hitherto been impossible to reduce the lautering duration to periods substantially less than the aforementioned, hitherto achieved periods in spite of decades of further development and optimisation of the existing lautering systems.

It has hitherto also been impossible to provide a method for obtaining wort continuously which is suitable in practice.

SUMMARY OF THE INVENTION

In terms of the invention, the term "mash" includes the meaning which is familiar to the skilled person in the brewing or beverage industry. However, "mash" can also include diluted mashes, in particular mixtures of a mash and water, and concentrated mashes, e.g. residual mashes, i.e. mashes from which wort or diluted wort has already been separated. Moreover, "mash" can include all types of mash, in particular beer mashes and whiskey mashes, which are known to the person skilled in the art. However, in accordance with the invention, the term "mashes" can also be limited to media which are suitable for the production of beverages, preferably alcoholic beverages, in particular beer or beer-based mixed beverages or wort-based beverages.

In accordance with the invention, the term "separating device" is understood to mean any device which is suitable for separating one or more components of a mixture of substances. In particular, "separating device" includes a filter, screen or the like.

In accordance with the invention, "mixing" is understood to mean adding together two or more substances. However, this can also include the homogenisation of the resulting mixture.

In accordance with the invention, the term "clarifying" or "clarification" is understood to mean a procedure in which the clarity of a medium is increased by partial or complete separation of turbidity-forming substances. Furthermore, the term "clarifying" or "clarification" can also include setting a turbidity of a medium.

In terms of the present application, a method or method step is defined as being "continuous" if this method or method step is performed or runs without interruption. However, in accordance with the invention the definition of "continuously" can additionally also include methods or method steps which have one or more interruptions on a time scale of overall at the most 20%, preferably at the most 15%, preferably at the most 10%, preferably at the most 5%, in particular at the most 2% of the total duration of the relevant method or method step; or have one or more interruptions at an extent of the mass or volumetric flow rate of overall at the most 20%, preferably at the most 15%, preferably at the most 10%, preferably at the most 5%, in particular at the most 2% of the total mass or volumetric flow rate of the relevant method or method step.

Within the scope of this application, all methods or method steps not covered by the above definition of "continuous" are defined as being "discontinuous" or "batchwise". The definition of "discontinuous" can also include methods or method steps, of which the performance, although effected without interruption, is completed after at the most eight hours, preferably at the most six hours, and in which a predetermined portion of a substrate, such as e.g. a brew, double brew or partial brew and the like of a mash or a wort, is treated or processed.

In terms of the present application, the term "surface" (FA, FA1, FA2, ...) of a separating device (T, T1, T2, ...) includes the part of the entire outer, i.e. in contact with the environment, top or peripheral surface of the separating device which has the openings OP for separating a mash or residual mash and thus a separating or filtering function.

OBJECT OF THE INVENTION

It is an object of the invention to provide a device, a system and a method for obtaining and/or for clarifying wort and other media in the beer brewing and beverage industry and corresponding uses which are suitable for providing, improving or simplifying the procedure of obtaining and/or clarifying wort and other media from the beer brewing sector and beverage industry.

DESCRIPTION OF THE INVENTION

The object described above is achieved by the subjects of the claims and/or the subjects described hereinafter (numbers 1 to 170).

1. Device (V) for continuously or discontinuously obtaining a wort (WO) from a mash (MA) in the beer brewing or beverage industry, at least comprising:
   a receiving unit (AG) for receiving the mash (MA);
   at least one separating device (T) having a surface (FA);
   wherein the surface (FA) has a multiplicity of openings (OP);
   wherein the device (V) is preferably suitable for continuously or discontinuously separating the mash (MA) into the wort (WO) and a residual mash (RM) by means of the surface (FA) of the separating device (T);
   wherein the surface (FA) or a part thereof can be brought into contact with the mash (MA), if the mash (MA) is present in the receiving unit (AG) for separation into the wort (WO) and the residual mash (RM);
   wherein, during the operation of the device (V), the surface (FA) is arranged such that it is moved or can be moved or can be rotated relative to the mash (MA), the residual mash (RM) and/or the receiving unit (AG).

2. Device according to number 1, characterised in that the separating device (T) is arranged in the device (V) such that by performing the relative movement or rotational movement the contact between the surface (FA) or a partial surface thereof and the mash (MA) present in the receiving unit (AG) can be intermittently interrupted and restored after the interruption has occurred;
   wherein the interruption and restoration of the contact between the surface (FA) or a part thereof and the mash (MA) can preferably be repeated.

3. Device according to number 1 or 2, characterised in that the separating device (T) is arranged in the device (V) such that by performing the relative movement or rotational movement the surface (FA) or a partial surface thereof exits from the mash (MA) in the region of the mash level or at the mash level or in the region of the mash surface or on the mash surface, issues out of the mash (MA) at this location or the contact with the mash (MA) is interrupted at this location, wherein the movement direction of the surface (FA), as viewed in the region of the mash level or at the mash level or the mash surface or the horizontal, forms an angle of 30 to 90°, preferably 45 to 90°, preferably 60 to 90°, preferably 70 to 90°, preferably 80 to 90°, preferably 85 to 90°, preferably 87 to 90°, in particular 90°.

4. Device according to any one of numbers 1 to 3, characterised in that the device (V), in particular the separating device (T), can be controlled by means of a control device (C) such that a relative movement or rotational movement of the surface (FA) is effected during the entire period of separation of the mash (MA) or the residual mash (RM).

5. Device according to any one of numbers 1 to 4, characterised in that the separating device (T) is arranged with respect to the receiving unit (AG) such that during the operation of the device (V) for separating the mash (MA) the surface (FA) is covered by the mash (MA) or is immersed in the mash (MA) at a proportion in the range of 1 to 95%, preferably 5 to 25%, preferably 5 to 20%, preferably 5 to 15%, preferably 5 to 10%, preferably 5 to 95%, preferably 10 to 90%, preferably 15 to 80%, preferably 20 to 80%, preferably 20 to 70%, preferably 20 to 60%, preferably 20 to 50%, preferably 20 to 40%, preferably 30 to 40%, in particular 20 to 30%, if the mash (MA) is present in the receiving unit (AG); and
   the surface (FA) is arranged in the periphery of the residual portion preferably in a gas-filled space (GR1) above the mash (MA) or protrudes therein.

6. Device according to any one of numbers 1 to 5, characterised in that the openings (OP) have a size or pore size or aperture in the range of 5 to 10000 µm, preferably 10 to 1000 µm, preferably 10 to 500 µm, preferably 20 to 400 µm, preferably 25 to 500 µm, preferably 30 to 300 µm, preferably 40 to 250 µm, preferably 45 to 350 µm, preferably 45 to 200 µm, preferably 45 to 100 µm, preferably 55 to 300 µm, in particular 65 to 250 µm.

7. Device according to any one of numbers 1 to 6, characterised in that the separating device (T) is designed as a separating device having a rotatably mounted shaft or having a rotatably mounted surface (FA) or as a rotatably mounted separating device or rotatably mounted filter; and/or
   the separating device (T) is disk-shaped or cylindrical or is substantially disk-shaped or cylindrical; and/or
   wherein the base surface and/or the peripheral surface of the separating device (T) is formed partially or completely as a separating or filtering surface, in particular as the surface (FA); and/or
   wherein the separating device (T) is arranged in the device (V) such that the central axis or an axis of rotation of the separating device (T) or the surface (FA) is arranged substantially in parallel with the liquid level of a liquid introduced into the receiving unit (AG) of the device (V), or the central axis or an axis of rotation of the separating device (T) or the surface (FA) forms, together with the liquid level of a liquid introduced into the receiving unit (AG) of the device (V) or with the horizontal, an angle with a value in the range of 0 to <90°, preferably 0 to 45°, preferably 0 to 30°, preferably 0 to 20°, preferably 0 to 15°, preferably 0 to 10°, in particular 0 to 5°.

8. Device according to any one of numbers 1 to 7, characterised in that the relative movement or rotational movement of the surface (FA) is effected in an uninterrupted or intermittent manner, in particular at regular time intervals.

9. Device according to any one of numbers 1 to 8, characterised in that the device (V) forms at least one flow path; and/or
   a liquid, in particular the mash (MA), can flow through the at least one flow path in a manner driven by gravity.

10. Device according to any one of numbers 1 to 9, characterised in that the surface (FA) is formed as a flat or planar surface or as a surface which has a convexly or concavely curved or wavelike or zigzag-shaped contour with respect to the mash (MA); and/or
    the separating device (T), preferably the surface (FA), has at least one protrusion (VO); wherein the at least one protrusion (VO) is arranged such that it can be brought into contact with the mash; wherein the at least one protrusion (VO) is suitable for moving or entraining solid particles, which originate from the mash (MA), in the mash (MA), and preferably for discharging said solid particles from the mash (MA) and/or from the receiving unit (AG); wherein the at least one protrusion (VO) preferably has a shape in the form of a bar, paddle, star, channel or pocket.

11. Device according to any one of numbers 1 to 10, characterised in that the device (V) has two separating devices (T; T1, T2);
    wherein the separating devices (T1, T2) are each designed as a separating device having a rotatably mounted shaft or as a rotatably mounted separating device or rotatably mounted filter; and/or
    wherein the two separating devices (T1, T2) are each arranged in the device (V) such that the central axis or an axis of rotation of each of the two separating devices (T1, T2) or their surfaces (FA1, FA2) is arranged substantially in parallel with the liquid level of a liquid introduced into the receiving unit (AG) of the device (V), or the central axis or an axis of rotation of each of the two separating devices (T1, T2) or their surfaces (FA1, FA2) forms, together with the liquid level of a liquid introduced into the receiving unit (AG) of the device (V) or with the horizontal, an angle with a value in the range of 0 to <90°, preferably 0 to 45°, preferably 0 to 30°, preferably 0 to 20°, preferably 0 to 15°, preferably 0 to 10°, in particular 0 to 5°; and/or
    wherein the two separating devices (T1, T2) are arranged with respect to one another in the device (V) such that the central axes or an axis of rotation of each of the two separating devices (T1, T2) or their surfaces (FA1, FA2) form an angle with a value in the range of 0 to <90°, preferably 0 to 45°, preferably 0 to 30°, preferably 0 to 20°, preferably 0 to 15°, preferably 0 to 10°, in particular 0 to 5°; and/or
    wherein the two separating devices (T1, T2) have an identical central axis or axis of rotation or their central axes or axes of rotation are arranged collinearly in the device (V); and/or
    wherein the two separating devices (T1, T2) have a common rotary shaft; and/or
    wherein the two separating devices (T1, T2) are arranged in the device (V) such that the largest spaced interval, which is measured preferably in parallel with the rotary shaft or as a normal spaced interval, between the two surfaces (FA1, FA2) of the two separating devices (T1, T2) is in the range of >2 cm to 100 cm, preferably 3 to 50 cm, preferably 4 to 30 cm, preferably 5 to 25 cm, preferably 10 to 30 cm, in particular 10 to 20 cm; and/or
    the smallest spaced interval, which is measured preferably in parallel with the rotary shaft or as a normal spaced interval, between the two surfaces (FA1, FA2) of the two separating devices (T1, T2) is in the range of >2 cm to 100 cm, preferably 3 to 50 cm, preferably 4 to 30 cm, preferably 5 to 25 cm, preferably 10 to 30 cm, in particular 10 to 20 cm.

12. Device according to any one of numbers 1 to 11, characterised in that the at least one separating device (T; T1, T2) is arranged in the device (V) such that the largest spaced interval, which is measured preferably as a normal spaced interval, between the surface (FA) and a wall of the device (V), preferably the receiving unit (AG), is in the range of >2 cm to 100 cm, preferably 3 to 50 cm, preferably 4 to 30 cm, preferably 5 to 25 cm, preferably 10 to 30 cm, in particular 10 to 20 cm; and/or
    the smallest spaced interval, which is measured preferably as a normal spaced interval, between the surface (FA) and a wall of the device (V), preferably the receiving unit (AG), is in the range of >2 cm to 100 cm, preferably 3 to 50 cm, preferably 4 to 30 cm, preferably 5 to 25 cm, preferably 10 to 30 cm, in particular 10 to 20 cm.

13. Device (V) for continuously or discontinuously obtaining a wort (WO) from a mash (MA) in the beer brewing or beverage industry, preferably a device according to any one of numbers 1 to 12 or comprising a feature defined in any one of numbers 1 to 12, at least comprising:
    a tub-like receiving unit (AG) for receiving the mash (MA);
    at least one separating device (T), preferably two separating devices (T1, T2), each having a surface (FA; FA1, FA2);
    wherein the at least one separating device (T; T1, T2) is formed in each case as a rotatably mounted, disk-shaped or cylindrical filter;
    wherein the surface (FA; FA1, FA2) is in each case the base surface of the at least one separating device (T; T1, T2) or a part thereof;
    wherein the surface (FA; FA1, FA2) is formed in each case as a flat or substantially flat filtering surface having a multiplicity of openings (OP);
    wherein the device (V) is preferably suitable for continuously or discontinuously separating the mash (MA) into the wort (WO) and a residual mash (RM) by means of the surface (FA; FA1, FA2);
    wherein the respective axis of rotation of the at least one separating device (T; T1, T2) is arranged perpendicularly or substantially perpendicularly with respect to the respective surface (FA; FA1, FA2);
    wherein the respective axis of rotation of the at least one separating device (T; T1, T2) forms, together with the liquid level of a liquid introduced into the receiving unit (AG) or with the horizontal, an angle with a value in the range of 0 to 20°, preferably 0 to 15°, preferably 0 to 10°, in particular 0 to 5°;
    wherein, when two separating devices (T1, T2) are present, they are arranged in the device (V) such that the normal spaced interval between the two surfaces (FA1, FA2) of the two separating devices (T1, T2) is in the range of 3 to 50 cm, preferably 4 to 30 cm, preferably 5 to 25 cm, preferably 10 to 30 cm, in particular 10 to 20 cm; and
    wherein the at least one separating device (T; T1, T2) is arranged with respect to the receiving unit (AG) such that during the operation of the device (V) for separating the mash (MA) the surface (FA) is covered by the mash (MA) or is immersed in the mash (MA) at a proportion in the range of 1 to 80%, preferably 5 to 25%, preferably 5 to 20%, preferably 5 to 15%, preferably 5 to 10%, preferably 15 to 80%, preferably 20 to 80%, preferably 20 to 70%, preferably 20 to 60%, preferably 20 to 50%, preferably 20 to 40%, preferably 30 to 40%, in particular 20 to 30%, if the mash (MA) is present in the receiving unit (AG); and
    the surface (FA) is arranged in the periphery of the residual portion in a gas-filled space (GR) above the mash (MA) or protrudes therein;
    wherein the surface (FA) or a part thereof can be brought into contact with the mash (MA), if the mash (MA) is present in the receiving unit (AG) for separation into the wort (WO) and the residual mash (RM);
    wherein, during the operation of the device (V), the surface (FA) is arranged such that it is moved or can be moved or can be rotated relative to the mash (MA), the residual mash (RM) and/or the receiving unit (AG).

14. Device (V) for continuously or discontinuously treating a medium (M), preferably for separating solids from the medium (M), in the beer brewing or beverage industry, wherein the medium (M) is a wort, preferably a lauter wort, kettle-full wort, cast wort, cold wort, hopped wort; or a beer, preferably a green beer, young beer, partially fermented or end-fermented beer, or other alcoholic or non-alcoholic beverage, preferably a beverage based upon wort or a mixed beer beverage; or a precursor thereof; wherein the device (V) comprises at least:

a receiving unit (AG) for receiving the medium (M);

at least one separating device (T) having a surface (FA);

wherein the surface (FA) has a multiplicity of openings (OP);

wherein the device (V) is preferably suitable for continuously or discontinuously separating the medium (M) into two fractions by means of the surface (FA) of the separating device (T);

wherein the surface (FA) or a part thereof can be brought into contact with the medium (M), if the medium (M) is present in the receiving unit (AG);

wherein, during the operation of the device (V), the surface (FA) is arranged such that it is moved or can be moved or can be rotated relative to the medium (M), one of the resulting fractions and/or the receiving unit (AG).

15. Device (V) according to number 14, characterised in that the device (V) further comprises at least one of the features of numbers 2 to 13.

20. System for continuously or discontinuously obtaining a wort (WO) from a mash (MA) in the beer brewing or beverage industry, at least comprising:

a first device (V1), wherein the first device (V1) is preferably a device (V) according to any one of numbers 1 to 15;

wherein the first device (V1) has a first receiving unit (AG1) for receiving the mash (MA);

wherein the first device (V1) has at least a first separating device (T1) having a first surface (FA1);

wherein the first surface (FA1) has a multiplicity of openings (OP);

wherein the first device (V1) is preferably suitable for continuously or discontinuously separating a mash (MA) into a first wort (WO1) and a first residual mash (RM1) by means of the first surface (FA1) of the first separating device (T1);

wherein the first surface (FA1) can be brought into contact with the mash (MA), if the mash (MA) is present in the first receiving unit (AG1) for separation into the first wort (WO1) and the first residual mash (RM1);

wherein, during the operation of the first device (V1), the first surface (FA1) is arranged such that it is moved or can be moved or can be rotated relative to the mash (MA), the first residual mash (RM1) and/or the first receiving unit (AG1); and wherein the first device (V1), in particular the first separating device (T1), can preferably be controlled by means of a first control device (C1) such that a relative movement or rotational movement of the first surface (FA1) is effected during the entire period of separation of the mash (MA).

21. System according to number 20, characterised in that the first separating device (T1) is arranged with respect to the first receiving unit (AG1) such that during the operation of the first device (V1) for separating the mash (MA) the first surface (FA1) is covered by the mash (MA) or is immersed in the mash (MA) at a proportion in the range of 1 to 95%, preferably 5 to 25%, preferably 5 to 20%, preferably 5 to 15%, preferably 5 to 10%, preferably 5 to 95%, if the mash (MA) is present in the first receiving unit (AG1); and the first surface (FA1) is arranged in the periphery of the residual portion preferably in a gas-filled space (GR1) above the mash (MA) or protrudes therein.

22. System according to number 20 or 21, characterised in that it further comprises:

a second device (V2), wherein the second device (V2) is preferably a device (V) according to any one of numbers 1 to 15;

wherein the second device (V2) has a second receiving unit (AG2), preferably a receiving vessel, for receiving the first residual mash (RM1) or a mixture containing the first residual mash (RM1);

wherein the second device (V2) has at least a second separating device (T2) having a second surface (FA2);

wherein the second surface (FA2) has a multiplicity of openings (OP);

wherein the second device (V2) is preferably suitable for continuously or discontinuously separating a first residual mash (RM1) into a second wort (WO2), in particular a first post-run wort (NG1), and a second residual mash (RM2) by means of the second surface (FA2) of the second separating device (T2);

wherein the second surface (FA2) can be brought into contact with the first residual mash (RM1), if the first residual mash (RM1) is present in the second receiving unit (AG2) for separation into the second wort (WO2) and the second residual mash (RM2);

wherein, during the operation of the second device (V2), the second surface (FA2) is arranged such that it is moved or can be moved or can be rotated relative to the first residual mash (RM1), the second residual mash (RM2) and/or the second receiving unit (AG2); and wherein the second device (V2), in particular the second separating device (T2), can preferably be controlled by means of a second control device (C2) such that the relative movement of the second surface (FA2) is effected in an uninterrupted or intermittent manner, in particular at regular time intervals, during the entire period of separation of the first residual mash (RM1); and wherein the system, preferably the second device (V2), has preferably a first unit (WZ1) for supplying water or a diluted wort, preferably a third wort (WO3).

23. System according to number 22, characterised in that the second separating device (T2) is arranged with respect to the second receiving unit (AG2) such that during the operation of the second device (V2) for separating the first residual mash (RM1) the second surface (FA2) is covered by the first residual mash (RM1) or is immersed in the first residual mash (RM1) at a proportion in the range of 1 to 95%, preferably 5 to 95%, preferably 5 to 25%, preferably 5 to 20%, preferably 5 to 15%, in particular 5 to 10%, if the first residual mash (RM1) is present in the second receiving unit (AG2); and the residual portion of the second surface (FA2) is arranged preferably in a second gas-filled space (GR2) or protrudes therein, wherein the second gas-filled space (GR2) is arranged over or above the first residual mash (RM1).

24. System according to number 22 or 23, characterised in that it further comprises:

a third device (V3), wherein the third device (V3) is preferably a device (V) according to any one of numbers 1 to 15;

wherein the third device (V3) has a third receiving unit (AG3), preferably a receiving vessel, for receiving the second residual mash (RM2) or a mixture containing the second residual mash (RM2);

wherein the third device (V3) has at least a third separating device (T3) having a third surface (FA3);

wherein the third surface (FA3) has a multiplicity of openings (OP);

wherein the third device (V3) is preferably suitable for continuously or discontinuously separating a second residual mash (RM2) into a third wort (WO3), in particular a second post-run wort (NG2), and a third residual mash (RM3) by means of the third surface (FA3) of the third separating device (T3);

wherein the third surface (FA3) can be brought into contact with the second residual mash (RM2), if the second residual mash (RM2) is present in the third receiving unit (AG3) for separation into the third wort (WO3) and the third residual mash (RM3);

wherein, during the operation of the third device (V3), the third surface (FA3) is arranged such that it is moved or can be moved or can be rotated relative to the second residual mash (RM2), the third residual mash (RM3) and/or the third receiving unit (AG3); and wherein the third device (V3), in particular the third separating device (T3), can preferably be controlled by means of a third control device (C3) such that the relative movement of the third surface (FA3) is effected in an uninterrupted or intermittent manner, in particular at regular time intervals, during the entire period of separation of the second residual mash (RM2); and wherein the system, preferably the third device (V3), has preferably a second unit (WZ2) for supplying water or a diluted wort, preferably a fourth wort (WO4).

25. System according to number 24, characterised in that the third separating device (T3) is arranged with respect to the third receiving unit (AG3) such that during the operation of the third device (V3) for separating the second residual mash (RM2) the third surface (FA3) is covered by the second residual mash (RM2) or is immersed in the second residual mash (RM2) at a proportion in the range of 1 to 95%, preferably 5 to 95%, preferably 5 to 25%, preferably 5 to 20%, preferably 5 to 15%, preferably 5 to 10%, if the second residual mash (RM2) is present in the third receiving unit (AG3); and the residual portion of the third surface (FA3) is arranged preferably in a third gas-filled space (GR3) or protrudes therein, wherein the third gas-filled space (GR3) is arranged over or above the second residual mash (RM2).

26. System according to number 24 or 25, characterised in that it further comprises:

a fourth device (V4), wherein the fourth device (V4) is preferably a device (V) according to any one of numbers 1 to 15;

wherein the fourth device (V4) has a fourth receiving unit (AG4), preferably a receiving vessel, for receiving the third residual mash (RM3) or a mixture containing the third residual mash (RM3);

wherein the fourth device (V4) has at least a fourth separating device (T4) having a fourth surface (FA4);

wherein the fourth surface (FA4) has a multiplicity of openings (OP);

wherein the fourth device (V4) is preferably suitable for continuously or discontinuously separating a third residual mash (RM3) into a fourth wort (WO4), in particular a third post-run wort (NG3), and a fourth residual mash (RM4), in particular spent grains, by means of the fourth surface (FA4) of the fourth separating device (T4);

wherein the fourth surface (FA4) can be brought into contact with the third residual mash (RM3), if the third residual mash (RM3) is present in the fourth receiving unit (AG4) for separation into the fourth wort (WO4) and the fourth residual mash (RM4);

wherein, during the operation of the fourth device (V4), the fourth surface (FA4) is arranged such that it is moved or can be moved or can be rotated relative to the third residual mash (RM3), the fourth residual mash (RM4) and/or the fourth receiving unit (AG4); and wherein the fourth device (V4), in particular the fourth separating device (T4), can preferably be controlled by means of a fourth control device (C4) such that the relative movement of the fourth surface (FA4) is effected in an uninterrupted or intermittent manner, in particular at regular time intervals, during the entire period of separation of the third residual mash (RM3); and wherein the system, preferably the fourth device (V4), has preferably at least a third unit (WZ3) for supplying water or a diluted wort.

27. System according to number 26, characterised in that the fourth separating device (T4) is arranged with respect to the fourth receiving unit (AG4) such that during the operation of the fourth device (V4) for separating the third residual mash (RM3) the fourth surface (FA4) is covered by the third residual mash (RM3) or is immersed in the third residual mash (RM3) at a proportion in the range of 1 to 95%, preferably 5 to 95%, preferably 5 to 25%, preferably 5 to 20%, preferably 5 to 15%, in particular 5 to 10%, if the third residual mash (RM3) is present in the fourth receiving unit (AG4); and the residual portion of the fourth surface (FA4) is arranged preferably in a fourth gas-filled space (GR4) or protrudes therein, wherein the fourth gas-filled space (GR4) is arranged over or above the third residual mash (RM3).

28. System according to any one of numbers 20 to 27, characterised in that the system has a first unit (WZ1), a second unit (WZ2) and/or a third unit (WZ3) each for supplying water or a diluted wort; and wherein the first unit (WZ1) is preferably arranged in the system such that the water or the diluted wort is supplied to the mash or the first residual mash (RM1) in the first device (V1) and/or downstream with respect to the first device (V1) and upstream with respect to the second device (V2) and/or in the second device (V2); and/or wherein the second unit (WZ2) is preferably arranged in the system such that the water or the diluted wort is supplied to the second residual mash (RM2) in the second device (V2) and/or downstream with respect to the second device (V2) and upstream with respect to the third device (V3) and/or in the third device (V3); and/or wherein the third unit (WZ3) is preferably arranged in the system such that the water or the diluted wort is supplied to a third residual mash (RM3) in the third device (V3) and/or downstream with respect to the third device (V3) and upstream with respect to a fourth device (V4) and/or in the fourth device (V4).

29. System according to any one of numbers 22 to 28, characterised in that the first unit (WZ1), the second unit (WZ2) and/or the third unit (WZ3) are each formed as an outlet opening, preferably as a nozzle, in particular as a flat jet nozzle, spray head or spray cone.

30. System according to any one of numbers 20 to 29, characterised in that at least one separating device (T), selected from the group consisting of the first separating device (T1), the second separating device (T2), the third separating device (T3) and the fourth separating device (T4), is designed as a separating device having a rotatably mounted separating or filtering surface, in particular having a rotatably mounted surface (FA1, FA2, FA3, FA4), or as a rotatably mounted separating device or rotatably mounted filter; and/or
   at least one separating device (T), selected from the group consisting of the first separating device (T1), the second separating device (T2), the third separating device (T3) and the fourth separating device (T4), is disk-shaped or cylindrical or is substantially disk-shaped or cylindrical; and/or
   wherein the base surface and/or the peripheral surface of the separating device or a part of the separating device is formed partially or completely as a separating or filtering surface, in particular as the surface (FA1, FA2, FA3, FA4); and/or
   wherein the at least one separating device (T), selected from the group consisting of the first separating device (T1), the second separating device (T2), the third separating device (T3) and the fourth separating device (T4), is arranged in the system such that the central axis or an axis of rotation of the separating device is arranged substantially in parallel with the liquid level of a liquid introduced into the respective receiving unit (AG1, AG2, AG3, AG4) of the respective device (V1, V2, V3, V4), or the central axis or an axis of rotation of the separating device (T) or its respective surface (FA1, FA2, FA3, FA4) forms, together with the liquid level of a liquid introduced into the respective receiving unit (AG1, AG2, AG3, AG4) of the respective device (V1, V2, V3, V4) or with the horizontal, an angle with a value in the range of 0 to <90°, preferably 0 to 45°, preferably 0 to 30°, preferably 0 to 20°, preferably 0 to 15°, preferably 0 to 10°, in particular 0 to 5°.

31. System according to any one of numbers 20 to 30, characterised in that the openings (OP) have a size or pore size or aperture in the range of 5 to 10000 μm, preferably 10 to 1000 μm, preferably 10 to 500 μm, preferably 20 to 400 μm, preferably 25 to 500 μm, preferably 30 to 300 μm, preferably 40 to 250 μm, preferably 45 to 350 μm, preferably 45 to 200 μm, preferably 55 to 300 μm, preferably 45 to 100 μm, in particular 65 to 250 μm.

32. System according to any one of numbers 20 to 31, characterised in that the relative movement or rotational movement of the first surface (FA1), the second surface (FA2), the third surface (FA3) and/or the fourth surface (FA4) is effected in an uninterrupted or intermittent manner, in particular at regular time intervals.

33. System according to any one of numbers 20 to 32, characterised in that, during the operation of the first device (V1) for separating the mash (MA) the first surface (FA1) is covered by the mash (MA) or is immersed in the mash (MA) at a proportion in the range of 1 to 95%, preferably 5 to 95%, preferably 5 to 25%, preferably 5 to 20%, preferably 5 to 15%, preferably 5 to 10%, preferably 10 to 90%, preferably 15 to 80%, preferably 20 to 80%, preferably 20 to 70%, preferably 20 to 60%, preferably 20 to 50%, preferably 20 to 40%, preferably 30 to 40%, in particular 20 to 30%.

34. System according to any one of numbers 20 to 33, characterised in that, during the operation of the second device (V2) for separating the first residual mash (RM1) the second surface (FA2) is covered by the first residual mash (RM1) or is immersed in the first residual mash (RM1) at a proportion in the range of 1 to 95%, preferably 5 to 95%, preferably 5 to 25%, preferably 5 to 20%, preferably 5 to 15%, preferably 5 to 10%, preferably 20 to 90%, preferably 30 to 80%, preferably 35 to 70%, in particular 40 to 60%.

35. System according to any one of numbers 20 to 34, characterised in that, during the operation of the third device (V3) for separating the second residual mash (RM2) the third surface (FA3) is covered by the second residual mash (RM2) or is immersed in the second residual mash (RM1) at a proportion in the range of 1 to 95%, preferably 5 to 95%, preferably 5 to 25%, preferably 5 to 20%, preferably 5 to 15%, preferably 5 to 10%, preferably 20 to 90%, preferably 30 to 80%, preferably 35 to 70%, in particular 40 to 60%.

36. System according to any one of numbers 20 to 35, characterised in that, during the operation of the fourth device (V4) for separating the third residual mash (RM3) the fourth surface (FA4) is covered by the third residual mash (RM3) or is immersed in the third residual mash (RM3) at a proportion in the range of 1 to 95%, preferably 5 to 95%, preferably 5 to 25%, preferably 5 to 20%, preferably 5 to 15%, preferably 5 to 10%, preferably 20 to 90%, preferably 30 to 80%, preferably 35 to 70%, in particular 40 to 60%.

37. System according to any one of numbers 20 to 36, characterised in that two, three, four or more, preferably up to 10, devices, selected from the group consisting of the first device (V1), the second device (V2), the third device (V3) and the fourth device (V4), are connected in series or in parallel.

38. System according to any one of numbers 20 to 37, characterised in that two, three, four or more first devices (V1) are connected in parallel; and/or two, three, four or more second devices (V2) are connected in parallel; and/or two, three, four or more third devices (V3) are connected in parallel; and/or two, three, four or more fourth devices (V4) are connected in parallel; and/or the first devices (V1), the second devices (V2), the third devices (V3) and/or the fourth devices (V4) are connected in series.

39. System according to any one of numbers 20 to 38, characterised in that the system forms at least one flow path; and
   a liquid or in particular the mash, the first residual mash (RM1), the second residual mash (RM2), the third residual mash (RM3) and/or the fourth residual mash (RM4) can flow through the at least one flow path preferably in a manner driven by gravity.

40. System according to any one of numbers 20 to 39, characterised in that the system has at least one barrier element;
   wherein preferably a first barrier element is arranged downstream with respect to the first device (V1) and upstream with respect to the second device (V2); and/or
   wherein preferably a second barrier element is arranged downstream with respect to the second device (V2) and upstream with respect to the third device (V3); and/or wherein preferably a third barrier element is arranged downstream with respect to the third device (V3) and upstream with respect to the fourth device (V4).

41. System for continuously or discontinuously treating a medium (M), preferably for continuously or discontinuously separating solids from the medium (M), in the beer brewing or beverage industry, wherein the medium (M) is a wort, preferably a lauter wort, kettle-full wort, cast wort, cold wort, hopped wort; or a beer, preferably a green beer, young beer, partially fermented or end-fermented beer, or other alcoholic or non-alcoholic beverage, preferably a beverage based upon wort or a mixed beer beverage; or a precursor thereof;

the system at least comprising:
at least a first device (V1), wherein the first device (V1) is preferably a device (V) according to any one of numbers 1 to 15;
wherein the first device (V1) has a first receiving unit (AG1) for receiving the medium (M);
wherein the first device (V1) has at least a first separating device (T1) having a first surface (FA1);
wherein the first surface (FA1) has a multiplicity of openings (OP);
wherein the first device (V1) is preferably suitable for continuously or discontinuously separating the medium (M) into two fractions by means of the first surface (FA1) of the first separating device (T1);
wherein the first surface (FA1) can be brought into contact with the medium (M), if the medium (M) is present in the first receiving unit (AG1);
wherein, during the operation of the first device (V1), the first surface (FA1) is arranged such that it is moved or can be moved or can be rotated relative to the medium (M), one of the resulting fractions and/or the receiving unit (AG); and
wherein the first device (V1), in particular the first separating device (T1), can preferably be controlled by means of a first control device (C1) such that a relative movement or rotational movement of the first surface (FA1) is effected during the entire period of separation of the medium (M).

42. System according to number 41, characterised in that the system further comprises at least one of the features of numbers 20 to 40.

56. Method for continuously or discontinuously treating a medium (M), preferably for continuously or discontinuously separating solids from the medium (M), in the beer brewing or beverage industry, wherein the medium (M) is a wort, preferably a lauter wort, kettle-full wort, cast wort, cold wort, hopped wort; or a beer, preferably a green beer, young beer, partially fermented or end-fermented beer, or other alcoholic or non-alcoholic beverage, preferably a beverage based upon wort or a mixed beer beverage; or a precursor thereof or a suspension;

the method comprising the steps of:
(a) providing the medium (M);
(b) continuously or discontinuously separating the medium (M) into two fractions;
characterised in that
step (b) is performed using the device (V) according to any one of numbers 1 to 15 or the system according to any one of numbers 20 to 42.

58. Method for continuously or discontinuously obtaining a wort from a mash in the beer brewing or beverage industry, comprising the steps of:
(a) continuously or discontinuously supplying a mash (MA) to a first receiving unit (AG1) of a first device (V1), wherein the first device (V1) is preferably a device according to any one of numbers 1 to 15;
(b) continuously or discontinuously separating the mash (MA) into a first wort (WO1) and a first residual mash (RM1) in the first device (V1) by means of a first separating device (T1);
wherein the mash (MA) is brought into contact with a first surface (FA1) of the first separating device (T1),
wherein the filtrate or permeate is the first wort (WO1) and the filter residue or retentate is the first residual mash (RM1);
wherein, during the separation of the mash (MA) into the first wort (WO1) and the first residual mash (RM1), the first surface (FA1) moves relative to the mash (MA), the first residual mash (RM1) and/or the first receiving unit (AG1), or during the separation of the mash (MA) into the first wort (WO1) and the first residual mash (RM1), the first surface (FA1) rotates about a first central axis or axis (AX1) of the first separating device (T1); and
wherein the relative movement or the rotational movement of the first surface (FA1) is effected in an uninterrupted or intermittent manner, preferably at regular time intervals, during the entire period of separation of the mash (MA).

59. Method for continuously or discontinuously obtaining a wort from a mash in the beer brewing or beverage industry, comprising the steps of:
(a) continuously or discontinuously supplying a mash (MA) to a first receiving unit (AG1) of a first device (V1), wherein the first device (V1) is preferably a device according to any one of numbers 1 to 15;
(b) continuously or discontinuously separating the mash (MA) into a first wort (WO1) and a residual mash (RM1) in the first device (V1), by means of separating or filtering the mash (MA) with the aid of a first surface (FA1) of a first separating device (T1);
wherein the filtrate or permeate is the first wort (WO1) and the filter residue or retentate is the first residual mash (RM1);
wherein the separation is driven by the hydrostatic pressure of the mash (MA) and/or another pressure acting upon the mash (MA) and/or a negative pressure acting upon the first residual mash (RM1);
wherein, during the separation of the mash (MA) into the first wort (WO1) and the first residual mash (RM1), the first surface (FA1) moves relative to the mash (MA) present in the device (V1), the first residual mash (RM1) present in the first device (V1) and/or the first receiving unit (AG1), or
during the separation of the mash (MA), the first surface (FA1) rotates about a first axis (AX1) of the first separating device (T1); and
wherein the relative movement or the rotational movement of the first surface (FA1) is effected in an uninterrupted or intermittent manner, preferably at regular time intervals, during the entire period of separation of the mash (MA).

60. Method according to any one of numbers 56, 58 or 59, further comprising the steps of:
(c) mixing water or a diluted wort, preferably the third wort (WO3), with the first residual mash, obtained in the separation according to step (b), in a predefined volumetric flow ratio, wherein a first mixture (MX1) is obtained;

(d) prior to step (c): continuously or discontinuously supplying the first residual mash (RM1) to the second receiving unit (AG2) of the second device (V2); or after step (c): continuously or discontinuously supplying the first mixture (MX1) to the second receiving unit (AG2) of the second device (V2); wherein the second device (V2) is preferably a device according to any one of numbers 1 to 15;

(e) continuously or discontinuously separating the thus obtained first mixture (MX1) into a second wort (WO2) and a second residual mash (RM2) by means of a second separating device (T2) or by means of separating or filtering the first mixture (MX1) with the aid of a second surface (FA2) of the second separating device (T2) in the second device (V2);

wherein the filtrate or permeate is the second wort (WO2) and the filter residue or retentate is the second residual mash (RM2);

wherein the separation is driven by the hydrostatic pressure of the first mixture (MX1) and/or another pressure acting upon the first mixture (MX1) and/or a negative pressure acting upon the second residual mash (RM2);

wherein, during the separation of the first mixture (MX1) into the second wort (WO2) and the second residual mash (RM2), the second surface (FA2) moves relative to the first mixture (MX1) present in the second device (V2), the second residual mash (RM2) present in the second device (V2) and/or the second receiving unit (AG2), or during the separation of the first mixture (MX1) into the second wort (WO2) and the second residual mash (RM2), the second surface (FA2) rotates about a second axis (AX2) of the second separating device (T2); and wherein the relative movement or the rotational movement of the second surface (FA2) is effected in an uninterrupted or intermittent manner, preferably at regular time intervals, during the entire period of separation of the first mixture (MX1).

61. Method according to number 60, further comprising the steps of:

(f) mixing water or a diluted wort, preferably the fourth wort (WO4), with the second residual mash (RM2), obtained in the separation according to step (e), in a predefined volumetric flow ratio, wherein a second mixture (MX2) is obtained;

(g) prior to step (f): continuously or discontinuously supplying the second residual mash (RM2) to the third receiving unit (AG3) of the third device (V3); or after step (f): continuously or discontinuously supplying the second mixture (MX2) to the third receiving unit (AG3) of the third device (V3);

wherein the third device (V3) is preferably a device according to any one of numbers 1 to 15;

(h) continuously or discontinuously separating the thus obtained second mixture (MX2) into a third wort (WO3) and a third residual mash (RM3) by means of a third separating device (T3) or by means of separating or filtering the second mixture (MX2) with the aid of a third surface (FA3) of the third separating device (T3) in the third device (V3);

wherein the filtrate or permeate is the third wort (WO3) and the filter residue or retentate is the third residual mash (RM3);

wherein the separation is driven by the hydrostatic pressure of the second mixture (MX2) and/or another pressure acting upon the second mixture (MX2) and/or a negative pressure acting upon the third residual mash (RM3);

wherein, during the separation of the second mixture (MX2) into the third wort (WO3) and the third residual mash (RM3), the third surface (FA3) moves relative to the second mixture (MX2) present in the third device (V3), the third residual mash (RM3) present in the third device (V3) and/or the third receiving unit (AG3), or during the separation of the second mixture (MX2) into the third wort (WO3) and the third residual mash (RM3), the third surface (FA3) rotates about a third axis (AX3) of the third separating device (T3); and wherein the relative movement or the rotational movement of the third surface (FA3) is effected in an uninterrupted or intermittent manner, preferably at regular time intervals, during the entire period of separation of the second mixture (MX2).

62. Method according to number 61, further comprising the steps of:

(i) mixing water or a diluted wort with the third residual mash (RM3), obtained in the separation according to step (h), in a predefined volumetric flow ratio, wherein a third mixture (MX3) is obtained;

(j) prior to step (i): continuously or discontinuously supplying the third residual mash (RM3) to a fourth receiving unit (AG4) of the fourth device (V4); or after step (i): continuously or discontinuously supplying the third mixture (MX3) to the fourth receiving unit (AG4) of the fourth device (V4);

wherein the fourth device (V4) is preferably a device according to any one of numbers 1 to 15;

(k) continuously or discontinuously separating the thus obtained third mixture (MX3) into a fourth wort (WO4) and a fourth residual mash (RM4) by means of a fourth separating device (T4) or by means of separating or filtering the third mixture (MX3) with the aid of a fourth surface (FA4) of the fourth separating device (T4) in the fourth device (V4);

wherein the filtrate or permeate is the fourth wort (WO4) and the filter residue or retentate is the fourth residual mash (RM4) or the spent grains (SP);

wherein the separation is driven by the hydrostatic pressure of the third mixture (MX3) and/or another pressure acting upon the third mixture (MX3) and/or a negative pressure acting upon the fourth residual mash (RM4);

wherein, during the separation of the third mixture (MX3) into the fourth wort (WO4) and the fourth residual mash (RM4), the fourth surface (FA4) moves relative to the third mixture (MX3) present in the fourth device (V4), the fourth residual mash (RM4) present in the fourth device (V4) and/or the fourth receiving unit (AG4), or during the separation of the third mixture (MX3) into the fourth wort (WO4) and the fourth residual mash (RM4), the fourth surface (FA4) rotates about a fourth axis (AX4) of the fourth separating device (T4); and wherein the relative movement or the rotational movement of the fourth surface (FA4) is effected in an uninterrupted or intermittent manner, preferably at regular time intervals, during the entire period of separation of the third mixture (MX3).

63. Method according to any one of numbers 56 or 58 to 62, characterised in that the relative movement is a rotational movement clockwise or anticlockwise, preferably anticlockwise, wherein the rotational direction is determined from the viewing direction in which the inflowing medium to be separated, preferably the mash (MA) or residual mash (RM1, RM2, RM3) to be separated or the mixture (MX1, MX2, MX3) flows into the device from the left and the residual mash to be discharged leaves the device (V1, V2, V3, V4) to the right; and/or the relative movement of the first surface (FA1), the second surface (FA2), the third surface (FA3) and/or the fourth surface (FA4) is effected at a velocity in the range of 0.01 to 2.5 m/s, in particular 0.01 to 1.8 m/s; and/or the rotational movement of the first surface (FA1), the second surface (FA2), the third surface (FA3) and/or the fourth surface (FA4) is effected at a rotational speed in the range of 1 to 60 rpm, preferably 1 to 40 rpm, preferably 1 to 30 rpm, preferably 1 to 20 rpm, in particular 1 to 12 rpm; and/or the rotational movement of the first surface (FA1), the second surface (FA2), the third surface (FA3) and/or the fourth surface (FA4) is effected at a peripheral velocity or tip velocity in the range of 0.01 to <2.0 m/s, preferably 0.05 to 1.8 m/s, preferably 0.1 to 1.5 m/s, in particular 0.2 to 1.5 m/s.

64. Method according to any one of numbers 56 or 58 to 63, characterised in that the supply of the mash (MA) in step (a), the supply of the first residual mash (RM1) or the first mixture (MX1) in step (d), the supply of the second residual mash (RM2) or the second mixture (MX2) in step (g) and/or the supply of the third residual mash (RM3) or the third mixture (MX3) in step (j) is/are performed in the range of 0.25 to <2.0 m/s, preferably 0.3 to 1.8 m/s, preferably 0.5 to 1.5 m/s, in particular 0.8 to 1.5 m/s.

65. Method according to any one of numbers 56 or 58 to 64, characterised in that it further comprises the step of:
(l) using the first wort (WO1), the second wort (WO2), the third wort (WO3) or the fourth wort (WO4) to produce a beer, a mixed beer beverage or other beverage.

66. Method according to any one of numbers 56 or 58 to 65, characterised in that it further comprises the step of:
(m) producing a mixture from at least two arbitrary worts, in particular from two, three or four arbitrary worts, selected from the group consisting of the first wort (WO1), the second wort (WO2), the third wort (WO3) and the fourth wort (WO4);
(n) using the mixture (WOMX) resulting in step (j) to produce a beer, a mixed beer beverage or other beverage;

67. Method according to any one of numbers 56 or 58 to 66, characterised in that, during the separation of the mash (MA), the contact between the first surface (FA1) or a partial surface thereof and the mash (MA) present in the first receiving unit (AG1) is intermittently interrupted and restored after the interruption has occurred by performing the relative movement or rotational movement of the first surface (FA1);
wherein the interruption and restoration of the contact between the first surface (FA1) or a partial surface thereof and the mash (MA) is preferably repeated.

70. Method according to any one of numbers 56 or 58 to 67, characterised in that, during the separation of the first residual mash (RM1), the contact between the second surface (FA2) or a partial surface thereof and the first residual mash (RM1) present in the second receiving unit (AG2) is intermittently interrupted and restored after the interruption has occurred by performing the relative movement or rotational movement of the second surface (FA2);
wherein the interruption and restoration of the contact between the second surface (FA2) or a partial surface thereof and the first residual mash (RM1) is preferably repeated.

71. Method according to any one of numbers 56 or 58 to 67 or 70, characterised in that, during the separation of the second residual mash (RM2), the contact between the third surface (FA3) or a partial surface thereof and the second residual mash (RM2) present in the third receiving unit (AG3) is intermittently interrupted and restored after the interruption has occurred by performing the relative movement or rotational movement of the third surface (FA3);
wherein the interruption and restoration of the contact between the third surface (FA3) or a partial surface thereof and the second residual mash (RM2) is preferably repeated.

72. Method according to any one of numbers 56 or 58 to 67 or 70 or 71, characterised in that, during the separation of the third residual mash (RM3), the contact between the fourth surface (FA4) or a partial surface thereof and the third residual mash (RM3) present in the fourth receiving unit (AG4) is intermittently interrupted and restored after the interruption has occurred by performing the relative movement or rotational movement of the fourth surface (FA4);
wherein the interruption and restoration of the contact between the fourth surface (FA4) or a partial surface thereof and the third residual mash (RM3) is preferably repeated.

73. Method according to any one of numbers 56 or 58 to 67 or 70 to 72, characterised in that, during the separation of the mash (MA) according to step (b), the first surface (FA1) is covered by the mash (MA) or is immersed in the mash (MA) at a proportion in the range of 1 to 95%, preferably 5 to 95%, preferably 5 to 25%, preferably 5 to 20%, preferably 5 to 15%, preferably 5 to 10%, preferably 10 to 90%, preferably 15 to 80%, preferably 20 to 80%, preferably 20 to 70%, preferably 20 to 60%, preferably 20 to 50%, preferably 20 to 40%, preferably 30 to 40%, in particular 20 to 30%, and
the first surface (FA1) is arranged in the periphery of the residual portion preferably in a first gas-filled space (GR1) over or above the mash (MA) or protrudes therein.

74. Method according to any one of numbers 56 or 58 to 67 or 70 to 73, characterised in that, during the separation according to step (e), the second surface (FA2) is covered by the first mixture (MX1) or is immersed in the first mixture (MX1) at a proportion in the range of 1 to 95%, preferably 5 to 95%, preferably 5 to 25%, preferably 5 to 20%, preferably 5 to 15%, preferably 5 to 10%, preferably 10 to 90%, preferably 15 to 80%, preferably 20 to 80%, preferably 20 to 90%, preferably 30 to 80%, preferably 35 to 70%, in particular 40 to 60%.

75. Method according to any one of numbers 56 or 58 to 67 or 70 to 74, characterised in that, during the separation according to step (h), the third surface (FA3) is covered by the second mixture (MX2) or is immersed in the second mixture (MX2) at a proportion in the range of 1 to 95%, preferably 5 to 95%, preferably 5 to 25%, preferably 5 to 20%, preferably 5 to 15%, preferably 5 to 10%, preferably 10 to 90%, preferably 20 to 90%, preferably 30 to 80%, preferably 35 to 70%, in particular 40 to 60%.

76. Method according to any one of numbers 56 or 58 to 67 or 70 to 75, characterised in that, during the separation according to step (k), the fourth surface (FA4) is covered by the third mixture (MX3) or is immersed in the third mixture (MX3) at a proportion in the range of 1 to 95%, preferably 5 to 95%, preferably 5 to 25%, preferably 5 to 20%, preferably 5 to 15%, preferably 5 to 10%, preferably 10 to 90%, preferably 20 to 90%, preferably 30 to 80%, preferably 35 to 70%, in particular 40 to 60%.
77. Method according to any one of numbers 56 or 58 to 67 or 70 to 76, characterised in that at least one medium, selected from the group consisting of the mash (MA), the first wort (WO1), the second wort (WO2), the third wort (WO3), the fourth wort (WO4), the first residual mash (RM1), the second residual mash (RM2), the third residual mash (RM3), the fourth residual mash (RM4), the first mixture (MX1), the second mixture (MX2) and the third mixture (MX3), is moved during at least one of the steps (a, b, d, e, g, h, j and k) in a manner driven by gravity, in particular only driven by gravity.
78. Method for continuously or discontinuously treating a medium (M), preferably for continuously or discontinuously separating solids from the medium (M), in the beer brewing or beverage industry, wherein the medium (M) is a wort, preferably a lauter wort, kettle-full wort, cast wort, cold wort, hopped wort; or a beer, preferably a green beer, young beer, partially fermented or end-fermented beer, or other alcoholic or non-alcoholic beverage, preferably a beverage based upon wort or a mixed beer beverage; or a precursor thereof or a suspension; the method comprising the steps of:
(a) continuously or discontinuously supplying the medium (M) to a first receiving unit (AG1) of a first device (V1), wherein the first device (V1) is preferably a device according to any one of numbers 1 to 15;
(b) continuously or discontinuously separating the medium (M) into two fractions in the first device (V1), by means of separating or filtering the medium (M) with the aid of a first surface (FA1) of a first separating device (T1);
wherein the separation is driven by the hydrostatic pressure of the medium (M) and/or another pressure acting upon the medium (M) and/or a negative pressure acting upon one of the fractions;
wherein, during the separation of the medium (M), the first surface (FA1) moves relative to the medium (M) present in the device (V1), one of the resulting fractions and/or the first receiving unit (AG1), or
during the separation of the medium (M), the first surface (FA1) rotates about a first axis (AX1) of the first separating device (T1); and
wherein the relative movement or the rotational movement of the first surface (FA1) is effected in an uninterrupted or intermittent manner, preferably at regular time intervals, during the entire period of separation of the medium (M).
79. Method according to number 78, characterised in that the method further comprises at least one of the features of numbers 56 or 58 to 67 or 70 to 77.
100. Unit (CU) for continuously or discontinuously clarifying a wort and/or for continuously or discontinuously setting a predetermined turbidity in a wort in the beer brewing or beverage industry, at least comprising:
a vessel (BO) for receiving a wort (WO); and
at least one spillover element (OF), wherein the at least one spillover element (OF) is formed as an overflow weir;
wherein the spillover element (OF) or at least one of the spillover elements (OF) is formed preferably as a movable element which allows the formation of a first passage (OP1), preferably a gap, between the spillover element (OF) or the at least one spillover element (OF) and the base and/or at least one side wall of the unit (CU).
101. Unit according to number 100, characterised in that the spillover element (OF) or at least one of the spillover elements (OF), the base of the unit (CU) and/or at least one side wall of the unit (CU) have at least one second passage (OP2) which allows the wort to flow out below the wort level (fill level) in the unit (CU).
102. Unit according to number 100 or 101, characterised in that the size of the first passage (OP1) and/or of the at least one second passage (OP2) can be controlled whilst the wort (WO) is flowing through, preferably for setting a predetermined turbidity in the resulting wort (WO), in particular for setting a predetermined load of particles, long-chain fatty acids (C16 to C18:2) and/or zinc.
109. Unit (CU) for continuously or discontinuously treating a medium (M), preferably for continuously or discontinuously separating solids from the medium (M) and/or for setting a predetermined turbidity in the medium (M), in the beer brewing or beverage industry, wherein the medium (M) is a wort, preferably a lauter wort, kettle-full wort, cast wort, cold wort, hopped wort; or a beer, preferably a green beer, young beer, partially fermented or end-fermented beer, or other alcoholic or non-alcoholic beverage, preferably a beverage based upon wort or a mixed beer beverage; or a precursor thereof;
the unit (CU) at least comprising:
a vessel (BO) for receiving the medium (M); and
at least one spillover element (OF), wherein the at least one spillover element (OF) is formed as an overflow weir;
wherein the spillover element (OF) or at least one of the spillover elements (OF) is formed preferably as a movable element which allows the formation of a first passage (OP1), preferably a gap, between the spillover element (OF) or the at least one spillover element (OF) and the base and/or at least one side wall of the unit (CU).
120. System for continuously or discontinuously clarifying a wort (WO) and/or for continuously or discontinuously setting a predetermined turbidity in the wort (WO) in the beer brewing or beverage industry, at least comprising:
two, three, four or more, preferably up to ten, units (CU1, CU2, CU3, CU4, . . . ), which are each a unit (CU) according to any one of numbers 100 to 102 and 109; and
wherein the two, three, four or more units (CU1, CU2, CU3, CU4, . . . ) are arranged in series and form a continuous flow path for the wort (WO).
128. System (ES), wherein the system (ES) comprises a combination of at least one device (V) according to any one of numbers 1 to 15 and at least one unit (CU) according to any one of numbers 100 to 102 and/or 109, wherein preferably the device (V) or the series-connected devices (V) are connected in series with the unit (CU) or the series-connected units (CU);
wherein preferably the device (V) or devices (V) is/are arranged upstream with respect to the unit (CU) or units (CU).
129. System (MS), wherein the system (MS) comprises a combination of at least one system according to any one of numbers 20 to 42 and at least one system according to number 120;
wherein preferably the system according to any one of numbers 20 to 42 or the series-connected systems according to any one of numbers 20 to 42 is/are arranged in series with the system according to number 120 or with the series-connected systems according to number 120;

wherein preferably the system according to any one of numbers 20 to 42 or the series-connected systems according to any one of numbers 20 to 42 is/are arranged upstream with respect to the system according to number 120 or the series-connected systems according to number 120.

130. Method for continuously or discontinuously clarifying a wort (WO) and/or for continuously or discontinuously setting a predetermined turbidity in the wort (WO) in the beer brewing or beverage industry, comprising the steps of:
  (a) providing a wort (WO), preferably providing a wort (WO) which has been produced by a method according to any one of numbers 1 to 15;
  (b) continuously or discontinuously supplying the wort (WO) to a first unit (CU1) in the region of or at an inflow point (IP1) of the first unit (CU1); wherein the first unit (CU1) is a unit according to any one of numbers 100 to 102 and 109;
  (c) continuously or discontinuously flowing the wort (WO) through the first unit (CU) from the inflow point (IP1) as far as to the at least one first spillover element (OF1) of the first unit (CU1); and
  (d) continuously or discontinuously flowing the wort (WO) out of the first unit (CU1), wherein the wort (WO) flows out partially or completely by flowing over the first spillover element (OF1);
    wherein the step (c) and/or the step (d) is/are performed preferably in a manner driven by gravity, in particular only driven by gravity.

150. Method for hopping a medium (M) in the beer brewing or beverage industry, wherein the medium (M) is a wort, preferably a lauter wort, kettle-full wort, cast wort, cold wort, or a beer, preferably a green beer, young beer, partially fermented or end-fermented beer, or other alcoholic or non-alcoholic beverage, preferably a beverage based upon wort or a mixed beer beverage; or a precursor thereof; wherein the method comprises at least the steps of:
  (a) providing a predetermined quantity of a hop or a hop product in a receiving unit (AG) of a device (V) according to any one of numbers 1 to 15; or continuously or discontinuously supplying a predetermined quantity of a hop or a hop product to a receiving unit (AG) of a device (V) according to any one of numbers 1 to 15;
  (b) mixing the hop or the hop product with a predefined volume of the medium (M) in the receiving unit (AG), wherein a mixture (HX) is obtained;
  (c) separating the thus obtained mixture (HX) into a hopped medium (HM) and a residue (R), preferably hop trub, with the aid of the separating device (T) of the device (V);
    wherein the mixture (HX) is brought into contact with a surface (FA) of the separating device (T),
    wherein the filtrate or permeate is the hopped medium (HM) and the filter residue or retentate is the residue (R);
    wherein, during the separation of the mixture (HX) into the hopped medium (HM) and the residue (R), the surface (FA) moves relative to the mixture (HX), the residue (R) and/or the receiving unit (AG), or
    during the separation of the mixture (HX) into the hopped medium (HM) and the residue (R), the surface (FA) rotates about a central axis or axis of rotation of the separating device (T); and
    wherein the relative movement or the rotational movement of the surface (FA) is effected in an uninterrupted or intermittent manner, preferably at regular time intervals, during the entire period of separation of the mixture (HX); and
    wherein the relative movement is preferably a rotational movement clockwise or anticlockwise, preferably anticlockwise, wherein the rotational direction is determined from the viewing direction in which the inflowing medium (M) flows into the device from the left and the residue (R) leaves the device (V) to the right.

160. Use of a device according to any one of numbers 1 to 15 or a system according to any one of numbers 20 to 42 for continuously or discontinuously obtaining a wort (WO) from a mash (MA) in the beer brewing or beverage industry, or for continuously or discontinuously obtaining a diluted wort from a residual mash or spent grains or a mixture containing water and residual mash or spent grains.

161. Use of a device according to any one of numbers 1 to 15 or a system according to any one of numbers 20 to 42 for continuously or discontinuously treating a medium (M), preferably for continuously or discontinuously separating solids from the medium (M), in the beer brewing or beverage industry;
  wherein the medium (M) is a wort, preferably a lauter wort, kettle-full wort, cast wort, cold wort, hopped wort; or a beer, preferably a green beer, young beer, partially fermented or end-fermented beer, or other alcoholic or non-alcoholic beverage, preferably a beverage based upon wort or a mixed beer beverage; or a precursor thereof 162. Use of a device (V) according to any one of numbers 1 to 15 or a system according to any one of numbers 20 to 42 for hopping a medium (M), wherein the medium (M) is a wort, preferably a lauter wort, kettle-full wort, cast wort, cold wort, or a beer, preferably a green beer, young beer, partially fermented or end-fermented beer, or other alcoholic or non-alcoholic beverage, preferably a beverage based upon wort or a mixed beer beverage; or a precursor thereof.

163. Use according to number 162, characterised in that the use comprises at least the steps of:
  (a) providing a predetermined quantity of a hop and/or a hop product in a receiving unit (AG) of a device (V) according to any one of numbers 1 to 15; or continuously or discontinuously supplying a predetermined quantity of a hop and/or a hop product to a receiving unit (AG) of a device (V) according to any one of numbers 1 to 15;
  (b) mixing the hop and/or the hop product with a predefined volume of the medium (M) in the receiving unit (AG), wherein a mixture (HX) is obtained; and
  (c) separating the thus obtained mixture (HX) into a hopped medium (HM) and a residue (R), preferably hop trub, with the aid of the separating device (T) of the device (V).

164. Use according to number 163, characterised in that a predetermined quantity of a hop and/or hop product is put into the receiving unit (AG) of the device (V); and subsequently a predetermined volume of the medium (M) to be hopped is introduced into the receiving unit (AG) and is mixed with the hop and/or hop product; or a predetermined volume of the medium (M) to be hopped is put in the receiving unit (AG) of the device (V); and subsequently a predetermined quantity of a hop and/or hop product is introduced into the receiving unit (AG) and is mixed with the medium (M).

165. Use according to number 164, further comprising the use of the device according to any one of numbers 1 to 15 or the system according to any one of numbers 20 to 42 for partially or completely removing the hop solid particles from the medium.

166. Use of a separating device (T), preferably a filter, in particular a separating device (T; T1, T2) according to any one of numbers 1 to 15 for continuously or discontinuously obtaining a wort (WO) from a mash (MA) in the beer brewing or beverage industry;
wherein the separating device (T) has a surface (FA) with a multiplicity of openings having a size or pore size or aperture in the range of 5 to 10000 µm, preferably 10 to 1000 µm, preferably 25 to 500 µm, preferably 45 to 350 µm, preferably 55 to 300 µm, in particular 65 to 250 µm;
wherein, as the wort is being obtained, the surface (FA) is moved relative to the mash;
wherein, as the wort is being obtained, the surface (FA) is covered by the mash (MA) or is immersed in the mash (MA) at a proportion in the range of 1 to 95%, preferably 5 to 20%, preferably 5 to 15%, preferably 5 to 10%, preferably 5 to 95%, preferably 10 to 90%, preferably 15 to 80%, preferably 20 to 80%, preferably 20 to 70%, preferably 20 to 60%, preferably 20 to 50%, preferably 20 to 40%, preferably 30 to 40%, in particular 20 to 30%.

167. Use according to number 166, characterised in that the separating device is designed as a separating device having a rotatably mounted separating surface or filtering surface or as a rotatably mounted separating device or rotatably mounted filter; and/or
the separating device is disk-shaped or cylindrical or is substantially disk-shaped or cylindrical; and/or
wherein the base surface and/or the peripheral surface of the separating device or a part of the base surface and/or the peripheral surface is formed partially or completely as a separating or filtering surface; and/or
wherein the separating device is arranged in the system such that the central axis or an axis of rotation of the separating device is arranged substantially in parallel with a liquid level (LL) of the mash (MA) present in the area surrounding the separating device, or
the central axis or an axis of rotation of the separating device forms, together with the liquid level (LL) of the mash (MA) present in the area surrounding the separating device or with the horizontal, an angle with a value in the range of 0.1 to 45°, preferably 0.1 to 20°, preferably 0.5 to 10°, preferably 0.5 to 8°, preferably 0.5 to 6°, in particular 0.5 to 4°.

168. Use of a unit (CU) according to any one of numbers 100 to 102 and 109 for continuously or discontinuously treating a wort (WO), preferably for continuously or discontinuously clarifying the wort (WO) and/or for continuously or discontinuously setting a predetermined turbidity in a wort (WO) in the beer brewing or beverage industry.

169. Use of a system according to any one of numbers 120, 128 or 129 for continuously or discontinuously treating a wort (WO), preferably for continuously or discontinuously clarifying the wort (WO) and/or for continuously or discontinuously setting a predetermined turbidity in a wort (WO) in the beer brewing or beverage industry.

170. Use of a unit (CU) according to any one of numbers 100 to 102 and 109 or a system according to any one of numbers 120, 128 or 129 for continuously or discontinuously treating a medium (M), preferably for continuously or discontinuously separating solids from the medium (M) and/or for continuously or discontinuously setting a predetermined turbidity in the medium (M), in the beer brewing or beverage industry;
wherein the medium (M) is a wort, preferably a lauter wort, kettle-full wort, cast wort, cold wort, hopped wort; or a beer, preferably a green beer, young beer, partially fermented or end-fermented beer, or other alcoholic or non-alcoholic beverage, preferably a beverage based upon wort or a mixed beer beverage; or a precursor thereof The present invention is based upon the observation of the inventors that the conventional methods in the production of beer or beverages, in particular lautering, the procedural steps of obtaining and clarifying the wort, in particular the first wort, are performed in the same device, namely the lauter tun or mash filter, and predominantly also in the same method step.

By reason of this combination of several method steps and in particular by reason of the fact that several method steps are performed in the same device, e.g. the lauter tun, these method steps cannot be individually and completely optimised.

The present invention is based upon the knowledge that procedural and device-related separation of obtaining the wort and clarifying the obtained wort is advantageous. By virtue of the fact that the steps of obtaining (separating the mash into wort and spent grains) and clarifying take place in a spatially separated manner in different devices, the respectively used device can be optimally adapted to the method step to be performed therein. On the other hand, the steps of separating and clarifying are decoupled from one another in terms of time. For instance, in accordance with the invention the separating device will no longer be occupied for clarifying the wort and, after separation is complete, can then be used directly for separating the mash of the next brew batch.

Therefore, the invention is based upon inventors' knowledge that by separating the lautering work into obtaining a turbid first wort with separation of coarse husk/spent grain components, sweetening the remaining solid components of the mash/spent grains in a manner extensively or completely separated therefrom in terms of space and time, and clarifying the obtained wort or setting a suitable turbidity of the wort and/or a suitable solids content which, in turn, is separated from these two steps in terms of space and time, it is possible to optimise in each case in their own right the method steps which are performed and the devices which are used for this purpose. By performing the partial steps separately, it is possible to avoid procedural and device-related compromises, which were necessary in the hitherto used methods and devices.

Since each method step can now be optimised in its own right, the procedure of obtaining wort or the lautering work in the brewhouse can be improved overall. In particular, in accordance with the invention wort is obtained in an accelerated manner in the brewhouse. In a particularly advantageous embodiment, the invention makes provision to obtain the wort continuously in contrast to conventional batch methods, as a result of which further advantages are achieved.

The inventors of the present application have also recognised that the method step of producing the wort in the brewing or beverage industry can be reduced considerably if, during the separation of the mash into wort and a residual mash or spent grains, the formation of a filter layer, consisting of components of the mash, is substantially or completely omitted. According to the inventors' knowledge, this is achieved by virtue of the fact that, during the separation of the mash, a surface provided with openings is moved relative to the mash provided.

By virtue of the relative movement between the mash and the surface of a separating device, the formation of a filter layer consisting of mash components is at least substantially avoided. As a result, the flow channels in the surface of the separating device provided with openings are kept clear so that the wort, when flowing through the surface of the separating device, is subjected to less flow resistance in comparison with the conventional methods for obtaining wort.

In accordance with the invention, in contrast to the classic lauter tun or mash filter, a movement of the separating device relative to the mash ensures, against expectation, that no appreciable filter layer consisting of mash components is formed as the wort particles pass through with solids being retained on the surface of the separating device. By virtue of the fact that the mash, as a result of the relative movement, encounters to a certain extent permanently or at least intermittently a surface which to a certain extent is "fresh" and is suitable for separation, the flow resistance as the wort flows through the separating device remains high without any substantial change during the course of the separation.

The inventors assume that on the one hand the formation of a filter layer is prevented by the relative movement between the mash and the surface of the separating device provided with openings. On the other hand, it is assumed that the components of the mash, in particular the solid particles contained therein, in conjunction with the described relative movement have an abrasive effect upon the surface of the separating device so that during the separation in accordance with the invention the mash has an unexpectedly high cleaning effect upon the surface of the separating device.

During the separation of the mash in accordance with the invention, the inventors knowingly accept that substantially only coarse particles are separated from the mash. However, according to the inventors' knowledge, in contrast to the previous method for obtaining wort as practised, finer mash components (the so-called fine mash particles) pass over into the wort. As a consequence, during the separation of the mash in accordance with the invention, a wort is obtained which has a higher turbidity and solids content than is typically desired or sought. Overall, it is possible in accordance with the invention to achieve a considerable reduction in the lautering duration. For instance, in accordance with the invention, a large-scale brew batch can be lautered in 45 min, 30 min or even less.

Since, in accordance with the invention, the surface of the separating device is blocked, if at all, only to a minimal extent even when volumetric flow rates of mash are high, the procedure of obtaining wort in accordance with the invention can be performed continuously or discontinuously with a long period of standing time. In contrast to the lautering methods (lauter tun; mash filter) performed previously as batch methods, the invention provides, when configured as a continuous method or a continuously operated device, shorter separating times, smaller devices and other advantages associated with continuous methods.

During the movement performed relative to the mash, the contact between the surface of the separating device or a partial surface thereof and the mash can be temporarily interrupted. If, during the separation from the mash, the relative movement is e.g. a rotational movement of the separating device or its surface, the surface or at least a partial surface thereof can exit from the mash and then re-enter the mash at a later point in time. On the one hand, as this surface element of the separating device exits from the mash, gravity acts upon the solids possibly adhering to the surface element. At the moment when a particle exits from the mash, i.e., at the moment the particle becomes detached from the liquid surface, the uplift which still acts against the gravity in the liquid body of the mash ceases to be effective so that in total a force which is directed to the earth's centre prevails. On the other hand, as said particle exits from the liquid, the surface tension of the mash is effective so that the adhering particles tend to remain on the surface of the mash or even in the mash accumulated at the separating device as a surface element of the separating device exits from the mash.

Therefore, forces specifically at the liquid level of the mash in the region of the boundary surface with respect to the surface or filtering surface of the separating device act upon the solid particles of the mash, wherein these forces can oppose the relative movement of the surface on the whole. Therefore, solid particles which are discharged, entrained or intermittently adhere to the surface of the separating device tend to exert, at the surface, in opposition to the relative movement a frictional effect at the moving surface or filtering surface of the separating device.

It is assumed that as a result the above-described cleaning effect is further enhanced and improved cleaning of the surface of the separating device is achieved.

In accordance with the invention, the surface of the separating device and/or the separating device as such can consist e.g. of high-grade steel, copper, synthetic material, preferably polypropylene, or a woven material/textile.

By virtue of the fact that the relative movement of the surface is performed during the entire period or at least for most of the period of separation, the surface of the separating device is cleaned constantly and therefore to a maximum extent in terms of time.

The surface of the separating device which is moved relatively can be covered by mash or can be immersed in the mash only to a limited extent during the separation procedure.

If the surface of the separating device is covered only partially by mash, solid particles which accumulate in the region of the mash level or mash surface by reason of the relative movement of the separating device, can be surprisingly easily and effectively "entrained" by the moving surface of the separating device and thus discharged from the mash and finally from the device. It is also surprising that the discharged particles, i.e., the residual mash or a part thereof, are discharged relatively "dry" having a dry substance content of up to 75%. Such dry discharge of residual mash or spent grain particles has not been achieved by the hitherto used lautering techniques, in particular the lauter tun and mash filter.

The advantage of a high degree of coverage of the surface of the separating device by mash is a large filtering surface and thus a high flow rate of mash or residual mass and a high volumetric flow rate of obtained wort.

The advantage of a medium to low degree of coverage of the surface of the separating device by mash is that the space provided for the enrichment and discharge, preferably the "driest" possible discharge, of solids from the mash and finally from the device is sufficiently available in the region of the surface of the separating device above the mash level.

With regard to the above-described characteristics, a degree of coverage or immersion of the surface of the separating device in the range of 1 to 60%, preferably 5 to 20%, preferably 5 to 15%, preferably 5 to 10%, preferably 30 to 60% has proven to be particularly advantageous.

In accordance with the invention, the gas-filled space of the device can contain a gas which contains or consists of air or preferably an inert gas, such as carbon dioxide, nitrogen or helium or mixtures thereof. The use of inert gases can prevent disadvantageous oxidation of the mash or wort.

By selecting the optimum pore size, it is possible, depending upon the composition of the mash, to set the volumetric flow rate of the obtained wort and the properties thereof in an advantageous manner in relation to the material composition thereof. For instance, in the case of a pore size of at least 65 µm, a satisfactory volumetric flow rate of the obtained wort is achieved. If a pore diameter of greater than 350 µm is selected, then even though a high volumetric flow rate of obtained wort is achieved, coarser particles are possibly no longer adequately separated. Furthermore, the contact between the mash and the surface of the separating device can in the receiving unit Furthermore, the separating device can be designed as a rotatably mounted separating device or as a rotatably mounted filter. In particular, the axis of rotation of the separating device can form, together the liquid level of a liquid introduced into the receiving unit of the device, a small angle value as described above. By virtue of this arrangement in which the surface of the separating device provided with openings is arranged perpendicularly or approximately perpendicularly with respect to the mash level, a high relative velocity of the mash with respect to the surface of the separating device is achieved when the separating device is rotated. As a result, effective cleaning of the surface is achieved.

In the case of the embodiment of the separating device in the form of a disk in which the base surface is formed as a surface which has the openings, or as separating surface, a compact separating device having a high ratio of surface having a separating effect to the entire surface can be achieved.

By selecting the spatial arrangement of the central axis or the axis of rotation of the separating device or its surface preferably approximately in parallel with the mash level, wherein deviations from the parallel orientation are certainly possible within specific limits in order to achieve the effects in accordance with the invention, the relative movement of the surface, the partial coverage of the surface or the partial immersion into the mash, effective cleaning of the surface and high discharge of solids can be achieved with a structurally simple device which is easy to handle.

Furthermore, a more or less perpendicular arrangement of the surface with respect to the mash level in combination with the merely partial coverage of the surface by the mash and the rotational movement also enables relatively "dry" spent grain particles to be separated in the region where the surface of the separating device exits from the mash surface during the course of the rotational movement. Surprisingly, this allows even a relatively "thick" residual mash or even relatively dry spent grain particles to be discharged from the mash and finally from the separating device.

It is particularly advantageous if the surface of the separating device is moved or can be moved relative to the mash, the residual mash and/or the receiving unit of the device such that a plurality of surface elements, the surface of the separating device which are covered by the mash during separation, exit from the mash during the course of the relative movement and at least intermittently are not covered by the mash, in order to then be immersed into the mash as the relative movement progresses.

If the mash or a residual mash can flow through the device in accordance with the invention solely as a result of gravity, the design of the device in accordance with the invention is simplified considerably e.g. by the omission of pumps etc.

Moreover, in accordance with the invention the energy consumption for operating the device is reduced by 40% or more compared with the conventional operation of a lauter tun. Furthermore, the lower consumption and/or the smaller number of consumers reduces the current consumption peaks of the devices or systems in accordance with the invention. As a result, the required installed power can be reduced. Furthermore, the amount of energy applied to the medium to be separated and therefore the heating thereof are lower, which has a beneficial effect upon the product. By being able to omit the action of pumping, the approaching flow pressure of the inflowing mash or residual mash is lower, whereby the surface of the separating device is additionally protected against becoming blocked.

The surface of the separating device can have a diverse shape which provides a high level of flexibility in terms of plant design. Preferred contours of the surface, such as e.g. convex, concave, undulating or zigzag-shaped contours can cause additional flow effects or swirling on the surface of the separating device in the vicinity of the surface which moves in the mash or residual mash and moves relative to the mash or residual mash. This further improves the cleaning of the surface.

The provision of protrusions, such as e.g. bars or paddles which protrude from the surface of the separating device and preferably are arranged perpendicularly or substantially perpendicularly or obliquely with respect to the direction of the relative movement of the surface of the separating device, improve the discharge of solids from the mash or residual mash and from the device.

The provision of two separating devices for each device, of which the surfaces effective for separation are arranged substantially in parallel with one another and are at a spaced interval of not more than 50 cm, preferably not more than 30 cm from one another is particularly preferred.

This provides a highly compact device with a large effective separating surface by reason of the presence of two (actively separating) surfaces of the separating devices or separating surfaces. If both surfaces also exhibit the same or approximately the same direction of the relative movement, in particular the same direction of rotation in the space, and the two surfaces of the separating devices are arranged spaced to a sufficiently small extent apart from one another, a particularly effective discharge of solids from the mash or residual mash and from the device is achieved, wherein the discharged solids have a relatively high dry substance content.

Similar effects are achieved if, in the presence of at least one separating device in the device, the distance from a wall of the device or in particular the receiving unit is sufficiently small, preferably not more than 50 cm, preferably not more than 30 cm.

The device in accordance with the invention is not limited to the procedure of obtaining wort. On the contrary, it can be used for a plurality of media from the brewing or beverage industry for the purpose of separating solids. In each case, similar advantages as those discussed above for separating mash/obtaining wort are achieved.

In accordance with the invention, the control devices can be formed as separate control devices. However, they can also be embodied in one single control device which performs the functions of the first, second, third and/or fourth control device in accordance with the invention.

The advantages of the device in accordance with the invention apply similarly to the system in accordance with the invention.

By connecting several, preferably two to four or more, in particular up to ten, devices in accordance with the invention in series, a multiple-stage separation of solids can be achieved. In the case of a system comprising multiple-stage separation, by adjusting the pore sizes of the openings of the surfaces of the individual devices, e.g. pore sizes which become increasingly smaller downstream, it is possible to completely prevent the separating surface from becoming clogged or blocked or at least to delay this for a longer period of time. As a result, the total achievable volumetric flow rate of the medium to be separated is high across the system.

Furthermore, other parameters, such as the degree of coverage or degree of immersion of the surface of the separating device in relation to the mash or residual mash, the shape of the respective separating device and in particular its respective surface and the other parameters which are stated within the scope of this application relating to the device in accordance with the invention or the system, can be adapted individually in every separating device in the cascade-like arrangement to suit the respective technological characteristics and objectives. This increases the overall flexibility of the system in accordance with the invention and its adaptability to suit the medium to be separated or obtained.

Between two separating stages, i.e., between a wort obtaining stage in the form of a device in accordance with the invention and the subsequent stage, a portion of an extraction agent, preferably water or a diluted wort, can be admixed in each case to the respective residual mash. In the subsequent wort obtaining stage, a wort is then obtained in a correspondingly high dilution (post-run wort). The more wort obtaining stages the system comprises, the more extensively the residual mash can be washed, whereby the extraction yield of wort production increases overall.

With regard to a high extraction yield and the avoidance of an undesirably high dilution of the resulting total wort volume, it is particularly efficient if the extraction agent is guided in counterflow with respect to the mash/residual mash flow. Therefore, e.g. at the end of the series or cascade of devices or of the system, water can be used as the extraction agent and the diluted wort obtained in the last stage can be used as the extraction agent in the penultimate stage.

However, a "fresh", i.e. wort-free, extraction agent, such as e.g. wort-free water can alternatively be used in each extraction step (mixing step). In this case, it is advantageous that the washing, in terms of an increased drop of the wort concentration from separating stage to separating stage, is more efficient than in the case of the counterflow operation described above. As a result, on the whole fewer separating stages are required overall, which reduces the outlay on equipment and costs.

The advantages of the device in accordance with the invention and the system in accordance with the invention apply similarly to the method in accordance with the invention.

The use of the device in accordance with the invention and of the system in accordance with the invention allows the setting of an increased turbidity and a specific solids load, at least as far as the fine particle fraction is concerned, in the resulting wort. The worts obtained by the methods for obtaining wort in accordance with the invention clearly differ from the bright, almost limpid worts which are typically desired nowadays in the lauter tun sequence. Therefore, in accordance with the invention specifically no profound depletion of the mash takes place. On the contrary, in the case of the method in accordance with the invention valuable mash ingredients, such as long-chain fatty acids (C16 to C18:2), zinc and a particle load which exerts a positive effect upon the fermentation behaviour and fermentation rate and possibly also upon the quality of the beers produced by the wort produced in accordance with the invention.

By supplying water or a diluted wort to the residual mash of the respective separating step and by providing a unit for this purpose which in each case is arranged in a separating device or in particular downstream with respect to a device and upstream with respect to the subsequent device, controlled sweetening (dissolving and separating water-soluble carbohydrates from the respective residual mash) is achieved.

By arranging a barrier element in the flow path downstream with respect to a device in accordance with the invention and upstream with respect to the subsequent device, i.e., in the flow path of the residual mash or residual mash diluted with water or wort between two devices, the suspension is forced to flow over a weir-like obstacle. In this case, solid particle sedimentation can be achieved in the barrier region upstream with respect to the barrier element, thus improving the clarifying effect.

In terms of extensively separating solids and efficiently obtaining extract, it is particularly advantageous to combine a barrier element and a unit for supplying water or a diluted wort, which are both arranged in each case between two devices in accordance with the invention.

The object in accordance with the invention is also achieved by a unit for clarifying a wort and/or for setting a predetermined turbidity or a predetermined solids content in a wort in the beer brewing or beverage industry.

The unit proposed in accordance with the invention for clarifying a wort and/or for setting a predetermined turbidity in a wort allows the wort obtained e.g. by the above-described separation of mash in accordance with the invention, or a wort obtained in a different manner or a different medium from the brewing, fermentation industry or beverage industry to be clarified in a manner separated in terms of space and time. Moreover, the proposed unit allows the setting of a suitable turbidity and/or suitable solids content in the media stated above.

The wort or another medium is supplied to a receiving vessel of the unit which is designed e.g. as an elongate channel, at or in the region of the inflow point. During the initial or start-up filling of the unit, the wort level in the receiving vessel increases at least until the wort level has reached the level of at least one spillover element. During flow through the receiving vessel of the unit between the inflow point and the spillover element, coarse and fine to superfine solid particles (also referred to as "fine mash particles" in brewing circles) are at least partially depleted from the wort through the effect of gravity. Therefore, the wort which flows over the spillover element or spillover elements can achieve a relatively high degree of clarity and can be extensively particle-free, approximately comparable to the turbidity of a classic lauter tun wort.

However, since it is not always desirable from a technological point of view to provide a wort having a high degree of clarity, the unit in accordance with the invention offers the possibility of easily setting the wort turbidity in a defined manner. For this purpose, at least one spillover element is formed as a movable element which renders it possible to open a passage, e.g. in the form of a gap on the base of the receiving vessel which is formed e.g. as a channel. For instance, when the gap is closed, wort having a high degree of clarity is obtained as it flows over the course. If the gap is opened by moving the spillover element, solid particles and turbidity causing ingredients of the wort which are sedimented during flow through the receiving vessel or which float in proximity to the base in the receiving vessel are discharged from the unit with the flow of wort. The wider the gap is opened, the larger is the proportion of turbid, particle-containing wort fraction and the more turbid and/or particle-rich is the resulting overall wort as a consequence. In this manner, the wort turbidity can be set easily and effectively depending upon the technological objective. The set wort turbidity can be maintained with a high level of uniformity.

In accordance with the invention, a qualitatively improved wort can be provided by setting a predetermined load of particles, long-chain fatty acids (C16 to C18:2) and/or zinc via the turbidity/solids content. As a consequence, it is possible to achieve advantages in terms of more rapid fermentation of the wort and improved beer quality, e.g. improved taste or froth stability.

If the unit is formed as an elongate vessel, the flow path which can be used for the sedimentation of particles is large. As a consequence, it is possible to achieve a high degree of separation for solid particles and/or a volumetric flow rate of wort.

However, the invention in accordance with the claimed unit is not limited only to the clarification of the wort or the setting of a predetermined turbidity. For instance, the proposed unit is also suitable for treating other media, in particular for separating solids from the medium in the beer and beverage sector.

In accordance with the invention, a system for clarifying a wort and/or for setting a predetermined turbidity in the wort is also proposed. In the system in accordance with the invention, two, three, four or more, preferably up to ten, of the above-described units are connected in series. This cascade-like structure of the system considerably improves the separating performance in comparison with a single unit having one flow path of the same length.

Moreover, a cascade-like structure of the units can be arranged in a space-saving space in the system, e.g. by arranging the plurality of units amongst one another.

This arrangement also offers the advantage that the wort flows through the system merely by reason of the effect of gravity, without pumping energy having to be applied for transporting the wort or the medium. As a result, the outlay on equipment is minimised, the energy consumption is kept low and the application of energy into the wort which reduces quality is minimised.

Effective solids separation combined with a sufficient volumetric flow rate of wort is achieved by restricting the flow velocity (linear velocity) to the stated ranges.

The unit in accordance with the invention for clarifying wort and the system consisting of a plurality of these units are not limited only to the treatment, in particular clarification or setting, of a predetermined turbidity but are also suitable for treating other media from the beer and beverage production sector.

The advantages of the unit in accordance with the invention for clarifying wort and the system consisting of a plurality of these units apply similarly to the method in accordance with the invention for clarifying a wort and/or for setting a predetermined turbidity in the wort.

The method in accordance with the invention is also not limited to the clarification of wort and the setting of a predetermined turbidity in the wort. It can also be used advantageously for separating solids from other media from the beer and beverage production sector.

The above-described inventive subjects, device, system and method for obtaining and/or for clarifying wort or other media in the beer brewing and beverage industry and corresponding uses are suitable for producing and/or clarifying worts from mashes, wherein the mashes have been produced using a conventional malt grist and/or adjunct grist, suitable for use in a lauter tun, in particular grist which has been produced by means of a 4 or 6 roller mill.

Surprisingly, the subjects in accordance with the invention are also suitable for obtaining and/or clarifying a wort from a mash or another medium which have been produced from a malt grist and/or adjunct grist suitable for use in a mash filter, in particular grist which has been produced by means of a hammer mill.

Furthermore, the subjects in accordance with the invention are also suitable for treating a mash or another medium, in particular obtaining and/or clarifying a wort from a mash, wherein the mash or the medium has been produced from one or several malted or unmalted raw materials, selected from the group of raw materials suitable for producing beer or other beverages.

Therefore, the subjects in accordance with the invention demonstrate a high, hitherto unknown flexibility with regard to the usable raw materials and the pretreatment, in particular the grinding, thereof. In the case of all of the usable raw materials and corresponding pretreatments, a high extract yield is achieved.

It is expressly a part of the invention that the above-described devices, systems, methods and uses for obtaining wort from mash or for treating a medium can each be combined with those devices, systems, methods and uses for clarifying a wort and/or for setting a predetermined turbidity or a predetermined solids content in a wort in the beer brewing or beverage industry or for treating a medium or for setting a predetermined turbidity or a predetermined solids content in the medium in the beer brewing or beverage industry. In particular, all of the features of advantageous embodiments stated in this application can also be combined with all of the claimed subjects.

In particular, it is a part of the invention that all of the devices in accordance with the invention for obtaining wort from mash and/or all of the devices in accordance with the invention for treating a medium (numbers 1 to 15 above) and/or all of the systems based upon these devices (numbers 20 to 40 above) and/or all of the methods in accordance with the invention for obtaining a wort and all of the methods in accordance with the invention for treating a medium (numbers 56 or 58 to 67 or 70 to 79 above) in each case individually or several in combination can be combined with in each case one or several in combination of the units in accordance with the invention for clarifying a wort and/or for setting a predetermined turbidity or a predetermined solids content in a wort in the beer brewing or beverage industry and/or all units in accordance with the invention for treating a medium (numbers 100 to 102 and 109 above), all systems in accordance with the invention based upon these units (numbers 120 and 128 and 129 above) and/or all methods in accordance with the invention for clarifying a wort and/or for setting a predetermined turbidity or a predetermined solids content in a wort in the beer brewing or beverage industry and all methods in accordance with the invention for setting a predetermined turbidity or a predetermined solids content in the medium in the beer brewing or beverage industry (number 130 above). Similarly, all of the features and advantages disclosed for the devices and methods in accordance with the invention can also be related to the uses disclosed explicitly and implicitly in this application and also apply to the uses as disclosed.

Furthermore, the invention comprises a method for hopping a medium in beer brewing (number 150 above). The quantity of hops are provided in the receiving unit of the device for obtaining a wort. By allowing the wort or another medium, which is to be hopped, such as e.g. a beer, to flow in, it is possible to achieve intensive mixing of the quantity of hops with the medium to be hopped. Subsequently, the solids can be separated from the hopped medium in a device in accordance with the invention for obtaining wort or in a unit in accordance with the invention for clarifying wort or the systems in accordance with the invention which are formed from a plurality thereof.

In a similar manner to the procedure of obtaining wort, hopping and/or in particular the subsequent separation of hop particles is/are effected in the above-described manner in accordance with the invention at a high rate, i.e., with a sufficient volumetric flow rate, and with the desired separation of solids being achieved.

The above-described advantages and effects of the corresponding devices or systems in accordance with the invention apply similarly to the uses in accordance with the invention (numbers 160 to 170 above).

All of the inventive devices (V), units (CU) and the systems based thereon can be operated discontinuously in the batch method. However, it is particularly advantageous if the inventive devices (V), units (CU) and the systems based thereon are operated continuously. Accordingly, the methods in accordance with the invention described in this application can be operated discontinuously, i.e., batch-wise, or continuously in a particularly advantageous manner. If the method in accordance with the invention consists of several steps, then all of the steps can each be performed continuously and therefore the entire method can be performed continuously. However, alternatively all of the steps can each be performed discontinuously and therefore the entire method can be performed discontinuously. However, the invention is not limited thereto. Accordingly, it is also a part of the invention that within the scope of the method in accordance with the invention continuous and discontinuous method steps can be combined with one another in any manner. The same applies to the embodiment of the device in accordance with the invention, the unit in accordance with the invention, the system in accordance with the invention and the uses in accordance with the invention.

To the inventors' knowledge, in particular no continuous method or a corresponding device for obtaining a wort from a mash and/or for clarifying a wort or setting a defined turbidity which would satisfy the requirements in practice has hitherto been available.

Alternatives

The device according to any one of numbers 1 to 15, the system according to any one of numbers 20 to 42 and the methods according to any one of numbers 56 or 58 to 67 or 70 to 79 are suitable not only for obtaining a wort from a mash. They can alternatively also be suitable or used for treating another medium, preferably separating solid particles from another medium, in the beer brewing or beverage industry, such as a wort, in particular a lauter wort, kettle-full wort, cast wort, cold wort, hopped wort; or a beer, such as a green beer, young beer, partially fermented or end-fermented beer, or other alcoholic or non-alcoholic beverage, such as a beverage based upon wort or a mixed beer beverage; or a precursor thereof. Accordingly, the method also includes methods for treating one of the above-defined media using the similar method steps, namely separating solids from the aforementioned media.

In particular, the device according to any one of numbers 1 to 15, the system according to any one of numbers 20 to 42 and the methods according to any one of numbers 56 or 58 to 67 or 70 to 79 can also be suitable or used for separating solids, preferably hop particles, hot trub, hot break, yeast, filter aids and the like, from the aforementioned media.

The invention includes not only the unit according to any one of numbers 100 to 102 and 109, the system according to any one of numbers 120 and 128 and 129, and the method according to number 130. The unit according to any one of numbers 100 to 102 and 109, the system according to any one of numbers 120 and 128 and 129, and the method according to number 130 can alternatively also be suitable and used for clarifying another medium or setting a predetermined turbidity in another medium in the beer brewing or beverage industry, such as a mash, wort, in particular a lauter wort, kettle-full wort, cast wort, cold wort, or a beer, such as a green beer, young beer, partially fermented or end-fermented beer, or other alcoholic or non-alcoholic beverage, such as in particular a beverage based upon wort or a mixed beer beverage; or a precursor thereof

DESCRIPTION OF FIGURES/DESCRIPTION OF ADVANTAGEOUS EMBODIMENTS OF THE INVENTION

FIG. 4 shows three devices connected in a cascading arrangement

FIG. 5 is a sectional view of a unit for clarifying wort;

FIG. 6 is a sectional view of a unit for clarifying wort with the spillover element displaced upwards; and FIG. 7 is a sectional view of the unit for clarifying work and setting turbidity.

Figure 1:
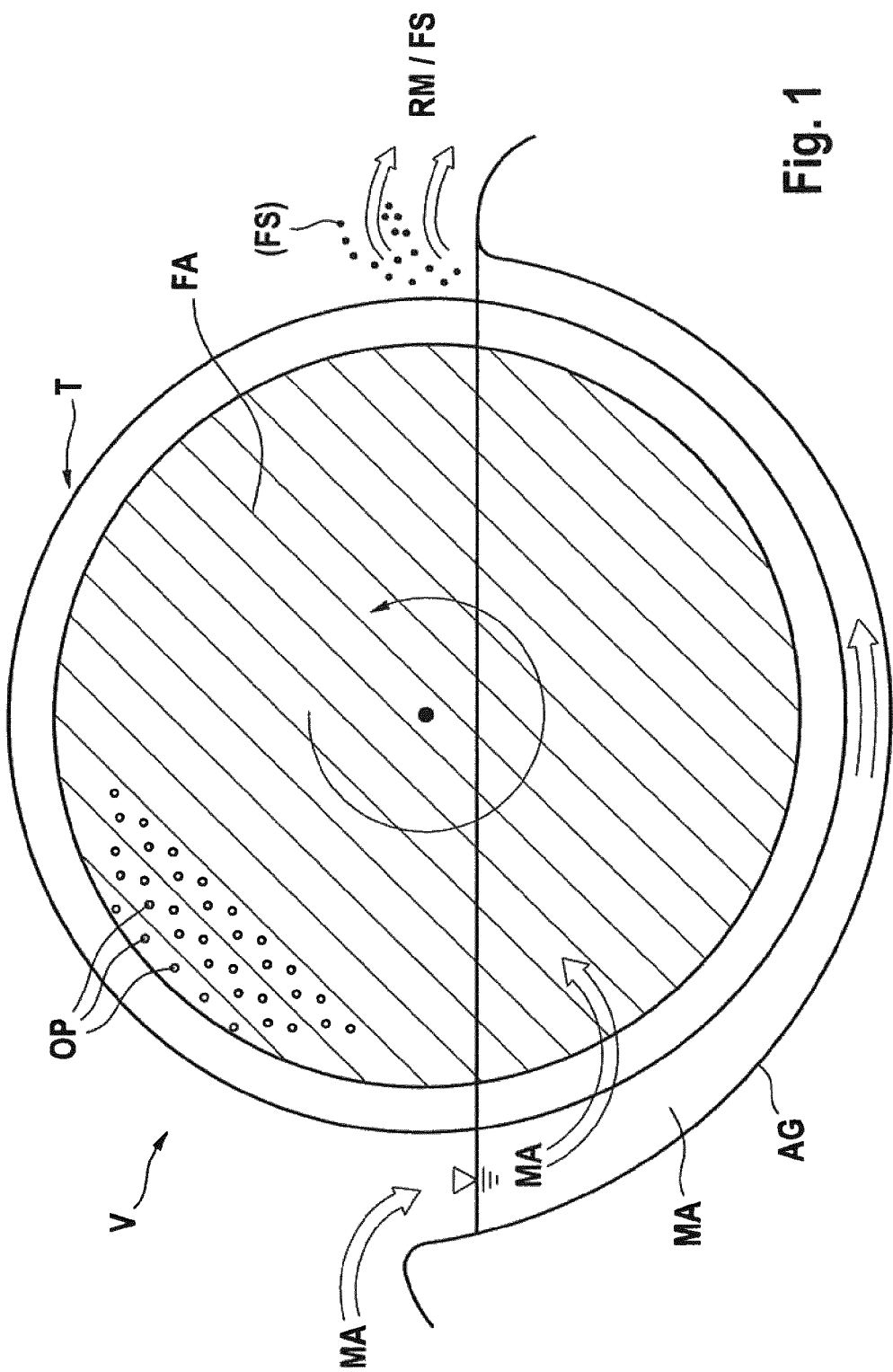
FIG. 1 is a perpendicular sectional view of the device according to the principles of the present invention.

FIG. 1 shows a perpendicular sectional view of an embodiment of the device (V) in accordance with the invention. This device has a receiving unit (AG) for receiving the mash (MA) and at least one separating device (T) having a surface (FA) (illustrated by hatching). The surface (FA) has a multiplicity of openings (OP) which in the figure are indicated only in a partial region of the surface (FA) for the sake of simplicity. Preferably, all of the partial surfaces of the surface (FA) are provided with openings in order to provide the largest possible filtering surface. In this embodiment, the receiving unit (AG) is formed as a tub-shaped vessel. The separating device (T) is a circular, disk-shaped filter element, on the base surface of which the surface (FA) is arranged. The separating device (T) is mounted so as to be rotatable about a central axis.

The central axis is oriented substantially in parallel with the horizontal. In the illustration of FIG. 1, the separating device (T) can rotate both clockwise and anticlockwise. However, the direction of rotation is preferably "anticlockwise".

In the figure, mash (MA) flows from the left into the receiving unit (AG) and partially covers the separating device (T) and in particular the surface (FA). The mash to be separated comes into contact with the surface (FA) formed as the filter layer. In this case, liquid particles pass through the filter layer and are discharged on the filtrate side as wort (WO) in or beyond the separating device (T). Since, during the separation, the surface (FA) performs a relative movement by rotating anticlockwise (cf. rotational arrow in FIG. 1), the surface (FA) covered by the mash is in movement relative to the mash (MA). Moreover, by reason of the rotation, parts of the surface (FA) constantly exit from the mash (right half of the surface (FA)), whereas other parts of the surface (FA) (left half of the surface (FA)) are immersed underneath the mash level and thus are then covered by the mash (MA). On the right-hand side of the device, the residual mash (RM) which results during the separation of the wort (WO) exits from the device (V) through the spillover element and optionally assisted by the rotating separating device (T). In the region where the surface (FA) appears, solid particles (FS), in particular relatively "dry" spent grain particles, can likewise be discharged from the device (V) during the rotation owing to the relative movement.

Figure 2:
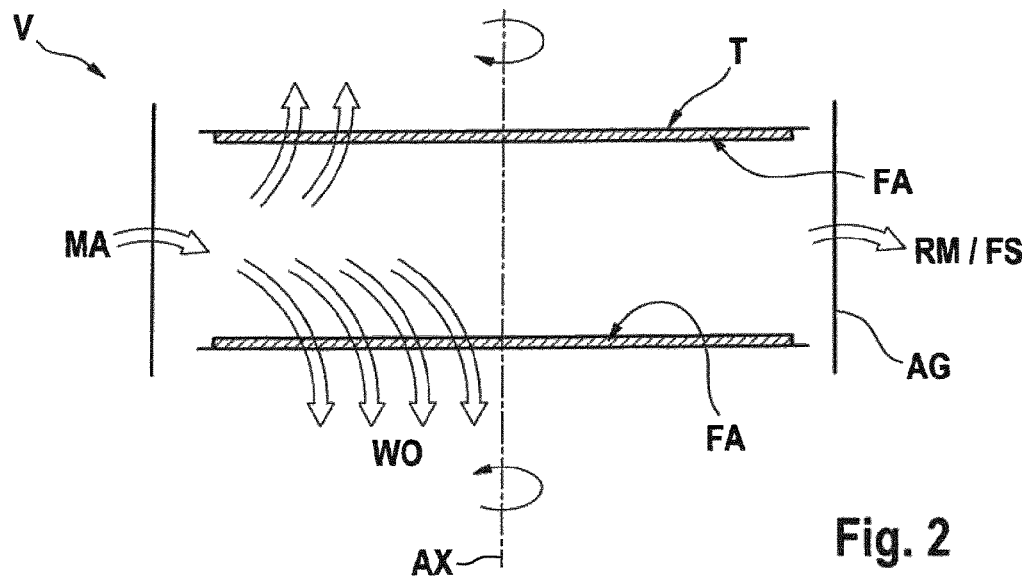
FIG. 2 is a sectional view of the device.

The device (V) in accordance with the invention is illustrated in a horizontal sectional view in FIG. 2. This figure illustrates once again the entry of the mash into the receiving unit (AG), the passage through the surface (FA) with wort (WO) being obtained. In this embodiment, the device (V) has two separating devices (T) which are arranged substantially in parallel and can rotate about a common axis of rotation (AX) (preferably in the same direction).

Figure 3:
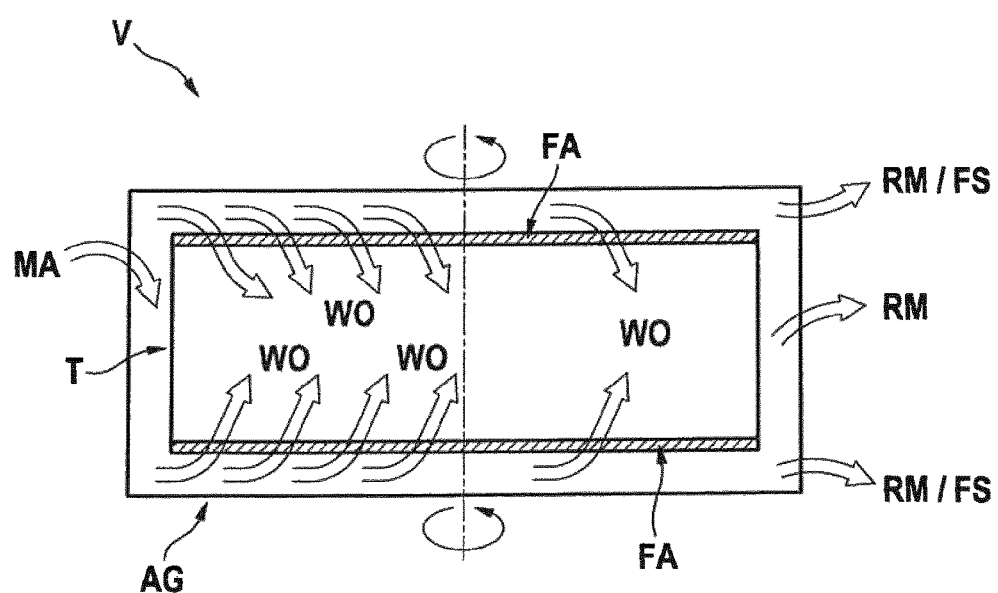
FIG. 3 shows the device with a separating device configured as a rotating cylinder.

In a particular embodiment illustrated in FIG. 3, the device (V) has a separating device (T) in the form of a rotating cylinder, of which both base surfaces are each designed as a surface (FA). In this case, the liquid penetrates from outside through the filter layers into the interior of the separating device (D) where it is collected and distilled.

FIG. 4 illustrates a system in accordance with the invention which is formed as a series connection or cascade of three devices (V) in accordance with the invention. After separating the mash (MA) into the wort (WO1) (first wort) and the first residual mash (RM1) in the first device (V1), as described, the first wort (WO1) is distilled. At the same time, the first residual mash (RM1) produced spills over from the first device. Water or a diluted wort (WO3) is added to this first residual mash (RM1) for extracting the residual extract still present in the first residual mash (RM1). The resulting mixture (MX1) is separated in the second device (V2) in a similar manner to the mash (MA) in the first device (V1). The resulting diluted wort (WO2) (first post-run wort) is distilled and the remaining second residual mash (RM2) is discharged from the second device (V2). In the third device (V3), the aforementioned steps are performed in a similar manner. Each further stage brings about a further extract depletion of the residual mash produced.

In the case of both the device (V) as shown in FIG. 1 and the system in accordance with the invention comprising three devices (V) as shown in FIG. 4, all of the media involved flow through the device or system in a manner driven substantially by gravity.

FIGS. 5 and 6 illustrate perpendicular sectional views of the unit (CU) in accordance with the invention for clarifying e.g. wort (WO). The wort (WO) which flows in on the left-hand side and is to be clarified is received by the vessel (BO). This vessel (BO) is formed as an elongate channel which, at its downstream end, has a spillover element (OF) in the form of an overflow weir. The inflowing wort (WO) flows from the inflow point in the direction of the spillover element (OF), whereas solid particles (FS) sink in the channel through the effect of gravity and the wort (WO) is thereby clarified. The clarified wort (WO) exiting at the spillover element has a relatively smaller solids content (spillover element (OF) closed at the base of the channel; FIG. 5).

However, if the spillover element (OF) is displaced upwards (cf. FIG. 6) so that a gap (SP) is produced between the lower end of the spillover element (OF) and the base of the channel, the wort can also flow out of the vessel (BO) through the gap. Solid particles (FS) together with the wort, i.e., a more turbid wort compared with the upper region of the spillover element (OF), can also be discharged in the region of the gap (SP). By correspondingly adapting the gap size, the desired wort turbidity or its solids content can be set in any manner.

FIG. 7 illustrates an advantageous embodiment of the system in accordance with the invention for clarifying a wort (WO) and/or for setting a predetermined turbidity in the wort (WO). The system has three of the above-described units (CU) which are connected in series. In the case of this cascade connection, the wort flows through the respective unit (CU), passes over in the region of the respective spillover element, leaves the unit (CU) and in the region of an inflow point is introduced into the receiving vessel (BO) of the next consecutive unit (CU). Depending upon the setting of the respective spillover element (OF) or the set gap size, a more or less turbid wort having a corresponding particle load can be distilled at the end of the cascade depending upon requirement.

In the case of both the unit (CU) as shown in FIGS. 5/6 and the system in accordance with the invention comprising three units (V) as shown in FIG. 7, the wort flows through the device or system in a manner driven by gravity.

A further preferred embodiment of the invention which is not illustrated as a figure consists of a system comprising four devices (V1; V2; V3; V4) in accordance with the invention which are connected in series. Each of the devices (V1; V2; V3; V4) has a separating device (T1; T2; T3; T4) which has two circular screen plates which are arranged substantially in parallel with one another and perpendicularly in the space. The openings (OP) of the first to fourth separating device (T1; T2; T3; T4) of the devices (V1; V2; V3; V4) have an aperture/screen size of about 75 p.m. The first to fourth separating devices (T1; T2; T3; T4) are each rotatably mounted and are each moved at a rotational speed of about 4 to 5 rpm during the operation. The surfaces (FA1; FA2; FA3; FA4) of the respective separating device (T1; T2; T3; T4) are each covered by the suspension which is to be separated in the respective device (mash (MA) in the first device (V1); first residual mash (RM1) in the second device (V2); second residual mash (RM2) in the third device (V3); and third residual mash (RM3) in the fourth device (V4)) at a proportion of 5 to 15%.

During the operation of the above-described system, the mash to be separated is supplied to the first device (V1) at a volumetric flow rate of 34 to 40 l/min. The liquid phase obtained in the first device (V1) is discharged as wort or first wort. The first residual mash (RM1) which also results is mixed with the liquid phase obtained in the third device (V3), wherein the liquid phase is added between the first device (V1) and the second device (V2). The first residual mash (RM1) which is diluted in this manner is supplied to the second device (V2). In the second device (V2), the liquid phase which is separated from the diluted first residual mash (RM1) is discharged as post-run wort. The remaining second residual mash (RM2) is discharged from the second device (V2) and is mixed with the liquid phase obtained in the fourth device (V4). The liquid phase is added between the second device (V2) and the third device (V3). The second residual mash (RM2) which is diluted in this manner is introduced into the third device (V3) where it is separated into a liquid phase and a third residual mash (RM3). As described above, this liquid phase is added at a volumetric flow rate of 18 to 20 l/min to the first residual mash (RM1) between the first device (V1) and the second device (V2).

After being discharged from the third device (V3), fresh water or brewing water is added at a volumetric flow rate of about 40 l/min to the third residual mash (RM3) between the third device (V3) and the fourth device (V4). The mixture obtained in this manner is introduced into the fourth device (V4). Here, this suspension is separated into a liquid phase and a fourth residual mash (RM4). As described above, the liquid phase is added at a volumetric flow rate of 18 to 20 l/min to the second residual mash (RM2) between the second device (V2) and the third device (V3). The fourth residual mash (RM4) is discharged from the system and sent for recycling or disposal. In the respective device (V1; V2; V3; V4) the mash or residual mash is separated in each case by means of the respective separating device (T1; T2; T3; T4).

The inventors have established that in the configuration of the system in accordance with the invention and the performance of the method in accordance with the invention, as described above, effective separating performance can be achieved whilst wort is being obtained, including effective washing of the respective residual mash with high extract yield. By reason of the selected rotational speed of the separating devices, a high level of separating performance and low electrical power consumption can be ensured. At a further reduced rotational speed of the separating devices in the system described above by way of example, the separating performance and yield were reduced. If higher rotational speeds are set, the electrical power consumption and thus current consumption increase. The continuous mode of operation of the system with washing of the respective residual mash in counterflow with respect to the extraction agent reduces the water consumption and thus optimises the water balance. It has also been established that the procedure of obtaining wort proposed in accordance with the invention leads to increased zinc and fatty acid contents in the wort obtained. As a result, during the subsequent fermentation of the wort obtained, yeast growth is improved and fermentation is accelerated.

The invention claimed is:

1. Device for obtaining a wort from a mash in beer brewing or beverage manufacturing; comprising:
   a tub-like receiving unit for receiving the mash;
   at least one separating device, each having a surface;
   wherein each of the at least one separating device is formed as a rotatably mounted, disk-shaped or cylindrical filter;
   wherein the surface is a base surface of the at least one separating device or a part thereof;
   wherein the surface is formed as a flat or substantially flat filtering surface having a multiplicity of openings;
   wherein a respective axis of rotation of the at least one separating device is arranged perpendicularly or substantially perpendicularly with respect to a respective surface;
   wherein the respective axis of rotation of the at least one separating device forms, together with the liquid level of a liquid introduced into the receiving unit or with horizontal, an angle with a value of 0 to 10°;
   wherein, when two separating devices are present, the separating devices are arranged such that a normal spaced interval between the two surfaces of the two separating devices is 3-50 cm; and
   wherein the at least one separating device is arranged with respect to the receiving unit such that during operation of the device for separating the mash the surface is covered by the mash or is immersed in the mash at a proportion of 1 to 95% if the mash is present in the receiving unit; and
   for a residual portion, the surface is arranged in a gas-filled space above the mash or protrudes therein;
   wherein the surface or a part thereof is contactable with the mash, if the mash is present in the receiving unit for separation into the wort and the residual mash portion;
   wherein, during operation of the device, the surface is arranged such that the surface is movable or rotatable relative to the mash, the residual mash and/or the receiving unit.

2. System for obtaining a wort from a mash in beer brewing or beverage manufacturing, comprising:
   a first device and a second device, wherein the first device and the second device each comprise a device according to claim 1.

3. A method for obtaining a wort from a mash in the beer brewing or beverage industry, comprising the steps of:
   (a) supplying a mash to a first receiving unit of a first device, wherein the first device is a device according to claim 1;
   (b) separating the mash into a first wort and a first residual mash in the first device, by separating or filtering the mash with the aid of a first surface of a first separating device;
   wherein the filtrate or permeate is the first wort and the filter residue or retentate is the first residual mash;
   wherein the separation is driven by hydrostatic pressure of the mash and/or another pressure acting upon the mash and/or a negative pressure acting upon the first residual mash;
   wherein, during the separation of the mash into the first wort and the first residual mash, the first surface moves relative to the mash present in the device, the first residual mash present in the first device and/or the first receiving unit, or the first surface rotates during separation of the mash about a first axis of the first separating device; and
   wherein relative movement or rotational movement of the first surface is effected in an uninterrupted or intermittent manner, during an entire period of separation of the mash.

4. The method according to claim 3, further comprising the steps of:
   (c) mixing water or a diluted wort, with the first residual mash, obtained in the separation according to step (b), in a predefined volumetric flow ratio, wherein a first mixture is obtained;
   (d) prior to step (c): supplying the first residual mash to a second receiving unit of a second device; or after step (c): supplying the first mixture to the second receiving unit of the second device;
   wherein the second device comprises:
   a tub-like receiving unit for receiving the mash;
   at least one separating device, each having a surface;

wherein each of the at least one separating device is formed as a rotatably mounted, disk-shaped or cylindrical filter;

wherein the surface is a base surface of the at least one separating device or a part thereof;

wherein the surface is formed as a flat or substantially flat filtering surface having a multiplicity of openings;

wherein a respective axis of rotation of the at least one separating device is arranged perpendicularly or substantially perpendicularly with respect to a respective surface;

wherein the respective axis of rotation of the at least one separating device forms, together with the liquid level of a liquid introduced into the receiving unit or with horizontal, an angle with a value of 0 to 10°;

wherein, when two separating devices are present, the separating devices are arranged such that a normal spaced interval between the two surfaces of the two separating devices is 3-50 cm; and wherein the at least one separating device is arranged with respect to the receiving unit such that during operation of the device for separating the mash the surface is covered by the mash or is immersed in the mash at a proportion of 1 to 95% if the mash is present in the receiving unit; and for a residual portion, the surface is arranged in a gas-filled space above the mash or protrudes therein;

wherein the surface or a part thereof is contactable with the mash, if the mash is present in the receiving unit for separation into the wort and the residual mash portion;

wherein, during operation of the device, the surface is arranged such that the surface is movable or rotatable relative to the mash, the residual mash and/or the receiving unit;

(e) separating the thus obtained first mixture into a second wort and a second residual mash by a second separating device or by separating or filtering the first mixture with the aid of a second surface of the second separating device in the second device;

wherein the filtrate or permeate is the second wort and the filter residue or retentate is the second residual mash;

wherein the separation is driven by the hydrostatic pressure of the first mixture and/or another pressure acting upon the first mixture and/or a negative pressure acting upon the second residual mash;

wherein, during the separation of the first mixture into the second wort and the second residual mash, the second surface moves relative to the first mixture present in the second device, the second residual mash present in the second device and/or the second receiving unit, or during the separation of the first mixture into the second wort and the second residual mash, the second surface rotates about a second axis of the second separating device; and wherein the relative movement or the rotational movement of the second surface is effected in an uninterrupted or intermittent manner, during the entire period of separation of the first mixture.

5. A method of using the separating device according to claim 1 comprising obtaining a wort from a mash in beer brewing or beverage manufacturing.

6. A method for hopping a wort, a beer, an alcoholic or non-alcoholic beverage, or a precursor thereof, in beer brewing or beverage manufacturing, the method comprising the steps of:
(a) providing a predetermined quantity of a hop or a hop product in a receiving unit of the device for obtaining a wort according to claim 1;
(b) mixing the hop or the hop product with a predefined volume of a medium in the receiving unit, wherein a mixture is obtained;
(c) separating the mixture into a hopped medium and a residue with the separating device of the device for obtaining a wort;
wherein the mixture is brought into contact with a surface of the separating device;
wherein the filtrate or permeate is the hopped medium and the filter residue or retentate is the residue;
wherein, during separation of the mixture into the hopped medium and the residue, the surface moves relative to the mixture, the residue and/or the receiving unit; or
during separation of the mixture into the hopped medium and the residue, the surface rotates about a central axis or axis of rotation of the separating device; and
wherein relative movement or rotational movement of the surface is effected in an uninterrupted or intermittent manner during an entire period of separation of the mixture; and
wherein the relative movement is a rotational movement clockwise or counter clockwise, wherein a rotational direction is determined from a viewing direction in which the medium flows into the device for obtaining a wort from the left and the residue leaves the device for obtaining a wort to the right.

7. A method of using of a device according to claim 1, comprising hopping a wort, a beer, an alcoholic or non-alcoholic beverage, or a precursor thereof.

8. A method of using of a system according claim 2, comprising hopping a wort, a beer, an alcoholic or non-alcoholic beverage, or a precursor thereof.

* * * * *